United States Patent
Hori et al.

(10) Patent No.: US 6,778,934 B1
(45) Date of Patent: Aug. 17, 2004

(54) AUTOMATIC MEASURING APPARATUS, AUTOMATIC MEASUREMENT DATA PROCESSING AND CONTROL APPARATUS, NETWORK SYSTEM, AND RECORDING MEDIUM OF AUTOMATIC MEASUREMENT PROCESSING AND CONTROL PROGRAM THAT SELECTS FROM A PLURALITY OF TEST CONDITIONS

(75) Inventors: Hideki Hori, Tokyo (JP); Yoshishige Kakinuma, Tokyo (JP); Toru Katsui, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 60 days.

(21) Appl. No.: 10/111,069
(22) PCT Filed: Oct. 19, 2000
(86) PCT No.: PCT/JP00/07286

§ 371 (c)(1),
(2), (4) Date: Apr. 19, 2002

(87) PCT Pub. No.: WO01/31285

PCT Pub. Date: May 3, 2001

(30) Foreign Application Priority Data

Oct. 22, 1999 (JP) ............................................ 11-301199

(51) Int. Cl.$^7$ ................................................ G06F 9/06
(52) U.S. Cl. .......................... 702/119; 702/81; 702/121; 702/122
(58) Field of Search .......................... 702/81, 119, 121, 702/122, 188, 57, 79, 89, 109, 120–123, 189, 190; 434/362; 250/574; 705/51; 717/141, 174

(56) References Cited

U.S. PATENT DOCUMENTS

| | | | |
|---|---|---|---|
| 4,967,381 A | 10/1990 | Lane et al. ............ | 364/551.01 |
| 5,081,592 A | 1/1992 | Jenq ............................ | 364/487 |
| 5,111,402 A | 5/1992 | Brooks et al. ......... | 364/424.04 |
| 5,206,582 A | 4/1993 | Ekstedt et al. .............. | 324/73.1 |
| 5,396,255 A | 3/1995 | Durkota et al. ............. | 342/360 |
| 5,721,908 A | 2/1998 | Lagarde et al. ............. | 395/610 |
| 5,748,846 A | 5/1998 | Kirkland et al. ............... | 395/20 |
| 6,160,213 A | * 12/2000 | Arnold et al. ................. | 84/615 |
| 6,256,773 B1 | * 7/2001 | Bowman-Amuah ............ | 717/1 |
| 6,389,010 B1 | * 5/2002 | Kubler et al. ................ | 370/353 |
| 6,411,623 B1 | * 6/2002 | DeGollado et al. ...... | 370/395.1 |

FOREIGN PATENT DOCUMENTS

| | | |
|---|---|---|
| EP | 0 474 944 A2 | 3/1992 |
| HU | 188 105 | 3/1984 |
| TW | 273061 | 3/1996 |
| WO | WO 98/26617 | 6/1998 |
| WO | WO 99/47937 | 9/1999 |

OTHER PUBLICATIONS

Taiwanese Office Action dated Aug. 28, 2002.

* cited by examiner

Primary Examiner—Marc S. Hoff
Assistant Examiner—Felix Suarez
(74) Attorney, Agent, or Firm—McGinn & Gibb, PLLC

(57) ABSTRACT

When measurement information of a model is entered, a condition file is automatically selected corresponding to a measurement category selected for each measured object displayed on an initialization screen. Next, when test selection items are selected, the selection results are retained in memory. The measurement category of the measured object can be selected and set on a menu screen and condition value change can be set using a test condition registration screen, etc. Thus, the test data is set and changed and the measurement state and the measurement result are displayed by operating the screens.

44 Claims, 17 Drawing Sheets

FIG. 7

| | DOMESTIC | | | NORTH AMERICA | | | | EUROPE | | | GENERAL EXPORT | | |
|---|---|---|---|---|---|---|---|---|---|---|---|---|---|
| A | SW | | FM | | MW | FM | | | LW | MW | FM | SW | MW | FM |
| B | | LW | FM | | MW | FM | | | LW | MW | FM | | MW | FM |
| C | | MW | FM | | MW | FM | | | LW | MW | FM | SW | MW | FM |
| D | | MW | FM | | MW | FM | | | LW | MW | FM | SW | LW | FM |
| E | | MW | FM | | MW | FM | | | | | | SW | LW | FM |
| F | | MW | FM | | | | | | | | | | | FM |
| G | | MW | FM | | MW | FM | | | | | | | MW | FM |
| H | | MW | FM | | MW | FM | | | | | | | MW | FM |
| I | SW | MW | FM | SW | MW | FM | WB | SW | LW | MW | FM | SW | MW | FM |
| J | | | | LW | MW | FM | WB | | | MW | FM | | | |
| K | | | | | | | | | LW | MW | FM | | MW | FM |
| L | | | | | | | | | LW | MW | FM | | | |
| M | | MW | FM | | MW | FM | | | LW | MW | FM | | | |
| N | | | | | | | | | | | | | | |

CLICK ON BAND TO BE MEASURED WITH LEFT BUTTON OF MOUSE, THEN CLICK ON MEASUREMENT BUTTON WITH LEFT BUTTON OF MOUSE.

[MEASUREMENT] [CLOSE]

| CONDITION FILE NAME | MEASURED BY | MEASUREMENT DATE | COMMENT |
|---|---|---|---|
| DRX740Z | YAMADA | 1999/01 ... | MASTER |
| MPS740Z | TANAKA | 1999/02 ... | |
| DPH740Z | SUZUKI | 1999/12 ... | |

MANUFACTURER: A
DESTINATION: DOMESTIC — 91
BAND: FM — 92
— 93
RETRIEVE — 94

SELECT — 95  DELETE — 96  CLOSE — 97

80 — ST SELECTION

SETUP ITEMS
- INSPECTION
- PERFORMANCE
- CROSS MODULATION
- TWO-SIGNAL SUPPRESSION/ INTERFERENCE
- ELECTRIC FIDELITY (f CHARACTERISTIC)
- MANUFACTURER DATA FORMAT

ALL ON   ALL OFF

TEST ITEMS
- HIGHEST SENSITIVITY
- PRACTICAL SENSITIVITY
- VIDEO-TO-INTERFERENCE RATIO
- INTERMEDIATE FREQUENCY-TO-INTERFERENCE RATIO
- SELECTIVITY
- PASS BAND
- ACG CHARACTERISTIC
- EXCESSIVE INPUT
- OVERMODULATION
- DISTORTION
- FREQUENCY CHARACTERISTIC
- MAXIMUM OUTPUT
- PRACTICAL MAXIMUM OUTPUT
- AUTOMATIC STOP SENSITIVITY
- S/N RATIO
- LEVEL DIFFERENCE
- NOISE CONVERGENCE POINT

ALL ON   ALL OFF

START MEASUREMENT
CHANGE SETTING
CLOSE

| TEST CONDITION | STANDARD VALUE LIST | MEASUREMENT CONDITION |

FM

| ITEM | | UNITS | STANDARD VALUE |
|---|---|---|---|
| RECEPTION FREQUENCY RANGE | | MHz | |
| INTERMEDIATE FREQUENCY | | MHz | |
| HIGHEST SENSITIVITY | | dBμ | |
| PRACTICAL SENSITIVITY | A TYPE | dBμ | |
| | B TYPE | | |
| | C TYPE | | |
| NOMITTER | | dB | |
| FREQUENCY CHARACTERISTIC | 70Hz | dB | |
| | 7000Hz | | |
| | Hz | | |
| SEPARATION DEGREE | 1KHz | dB | |
| | 7KHz | | |
| AUTOMATIC STOP SENSITIVITY | OX | dBμ | |
| | Lo | | |
| S/N | RMS FLAT | dB | |
| | CCIR PEAK | | |
| NOISE CONVERGENCE POINT | | dB | |
| CAPTURE RATIO | | dB | |

DATA

BASIC ITEMS
- MODEL NAME
- CONDITION FILE NAME
- MANUFACTURER: A
- DESTINATION: DOMESTIC
- BAND: FM
- PROTOTYPING STAGE: DESIGN PROTOTYPE
- SERIAL NO.
- LOT NO.
- COMMENT

CREATED BY:

| CONDITION FILE NAME | CREATED BY |
|---|---|
| DRX740Z | YAMADA |
| MPS740Z | TANAKA |
| DPH740Z | SUZUKI |

130

NEW SAVE DATA — 136
UPDATE — 137
COMPARE CONDITIONS — 138
CLOSE — 139

DATA

BASIC ITEMS
- MODEL NAME
- CONDITION FILE NAME
- MANUFACTURER: A
- DESTINATION: DOMESTIC
- BAND: FM
- PROTOTYPING STAGE: DESIGN PROTOTYPE
- SERIAL NO.
- LOT NO.
- COMMENT

CREATED BY:

| CONDITION FILE NAME | CREATED BY |
|---|---|
| DRX740Z | YAMADA |
| MPS740Z | TANAKA |
| DPH740Z | SUZUKI |

| TEST CONDITION | STANDARD VALUE LIST | MEASUREMENT CONDITION |
|---|---|---|

MEASUREMENT ITEMS (RUN DATA SELECTION)
- ☑ INSPECTION
- ☑ PERFORMANCE
- ☑ CROSS MODULATION
- ☑ TWO-SIGNAL SUPPRESSION/INTERFERENCE
- ☑ ELECTRIC FIDELITY (f CHARACTERISTIC)
- ☑ MANUFACTURER DATA FORMAT

TEST ITEMS [ALL ON] [ALL OFF]
- ☑ HIGHEST SENSITIVITY
- ☑ PRACTICAL SENSITIVITY
- ☑ VIDEO-TO-INTERFERENCE RATIO
- ☑ INTERMEDIATE FREQUENCY-TO-INTERFERENCE RATIO
- ☑ SELECTIVITY
- ☑ PASS BAND
- ☑ ACG CHARACTERISTIC

MEASUREMENT FREQUENCY

| | UNITS |
|---|---|
| ① | KHz |
| ② | |
| ③ | |
| ④ | |
| ⑤ | |

| TEST ITEMS | MISCELLANEOUS |
|---|---|

| | | UNITS |
|---|---|---|
| DETERMINATION METHOD | | |
| ALLOWABLE RANGE | | |
| ADJUST | TOP | |
| | BOTTOM | |
| SLEEP TIME | | |
| FILTER | LPF | ⦿OFF ○100Hz ○200Hz |
| | HPF | ⦿OFF ○15KHz ○20KHz ○80Hz ○OPTION |
| | PSOPHO | ⦿OFF ○1EC-A ○DIN AUDIO ○CCIR ARM ○OPTION mg |

[NEW SAVE DATA] 156  [UPDATE] 157  [COMPARE CONDITIONS] 158  [CLOSE] 159

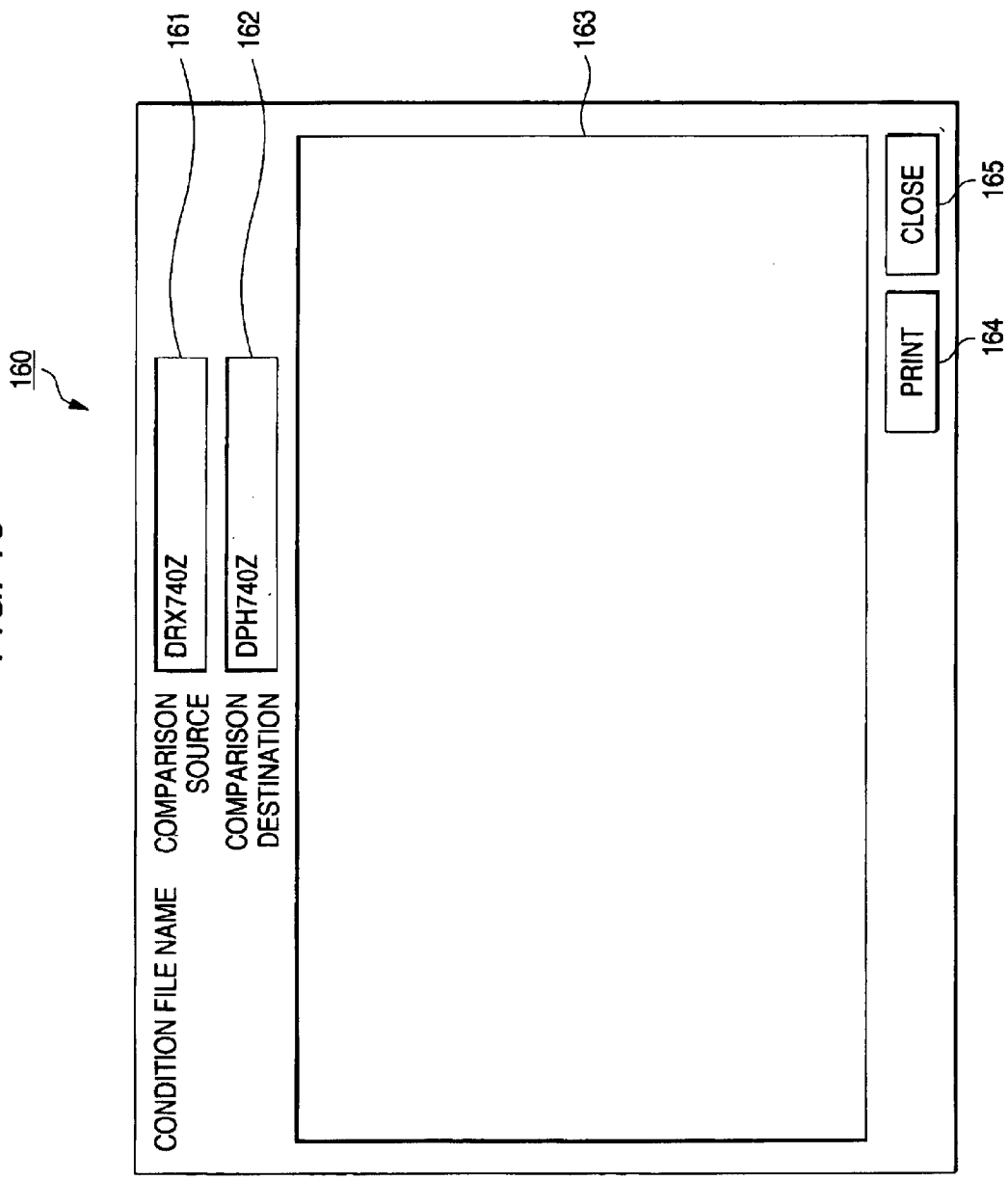

FIG. 17

| MEASUREMENT DATA | | | | | | |
|---|---|---|---|---|---|---|
| MANUFACTURER | DESTINATION | BAND | | MEASUREMENT ITEM | | |
| A ▼ | DOMESTIC ▼ | FM ▼ | | INSPECTION ▼ | | RETRIEVE |

| CONDITION FILE NAME | PROTOTYPING STAGE | NO. | MEASURED BY | MEASUREMENT DATE | COMMENT |
|---|---|---|---|---|---|
| DRX740Z | DESIGN PROTOCOL | 1 | YAMADA | 1999/08/20 | |
| MPS740Z | MODEL PROTOCOL | 2 | SUZUKI | 1999/08/20 | |
| DPH740Z | FINAL PROTOCOL | 3 | YAMAMOTO | 1999/08/20 | |

PREVIEW — 174
EDIT — 175
DELETE — 176
CLOSE — 177

170, 171, 172, 173

AUTOMATIC MEASURING APPARATUS, AUTOMATIC MEASUREMENT DATA PROCESSING AND CONTROL APPARATUS, NETWORK SYSTEM, AND RECORDING MEDIUM OF AUTOMATIC MEASUREMENT PROCESSING AND CONTROL PROGRAM THAT SELECTS FROM A PLURALITY OF TEST CONDITIONS

TECHNICAL FIELD

This invention relates to automatic measurement technology of electronic machines such as audio machines and setting technology of test data involved in automatic measurement.

BACKGROUND ART

Hitherto, an automatic measuring apparatus for conducting a performance inspection of electronic machines such as in-car audio machines, which will be hereinafter referred to as measured objects, has been proposed and used for performance inspection on a manufacturing line, prototype test in a developing process, quality inspection, etc.

Since there are various types of measured objects and measurement items, measurement conditions, etc., vary from one type of measured object to another, configuring an automatic measuring apparatus for each type of measured object is uneconomical and is contrary to automation and labor saving of inspection. Thus, various improvements have been made (for example, (1) automatic measuring apparatus is configured so as to deal with multi-purpose measurement elements by combining a plurality of measurement functions and signal lines in one and (2) to improve saving time and labor of setting a plurality of inspection conditions formerly set by manual operation at the final operation inspection time before shipment, the inspection conditions are previously written into ROM of a control microcomputer contained in an audio machine and setting the inspection conditions on an electronic volume and a display panel is automatically executed by performing predetermined button operation.

In recent years, there has been a general tendency of electronic machines toward multifunctional, high-grade machines having various functions such as audio machines. The electronic machines may be sold to the ultimate consumers as discrete commodity products; however, if the electronic machines are shipped as OEM products as with in-car audio machines, even the same model may often differ in measurement items, measurement conditions, and standard depending on the supplied manufacturer with the products, the destination, etc.

At the developing stage and the quality assurance inspection stage (and the sampling inspection stage on the manufacturing line), hitherto, setting the measurement items, the measurement conditions, and the standard in an automatic measuring apparatus for measuring measured objects has been executed by manual work, and problems of taking time and labor and easily making a mistake are involved (in (2) mentioned above, the inspection conditions are previously written into the ROM of each measured object (audio machine) and thus the configuration cannot cope with the case where the supplied party with the products or the destination is changed or the case where the inspection conditions are not determined at the developing stage).

Hitherto, the input items and the output items (measurement values and determination result) of an automatic measuring apparatus have been displayed on a display panel and if the determination result is "not good," an alarm or a warning has been used to indicate the "not good" result. Thus, if the measurement items, the measurement conditions, and the standard differ depending on the supplied manufacturer with the products, the destination, etc., it has been difficult to display the measurement values and the determination result corresponding to the input items (the measurement items, the measurement conditions, and the standard different depending on the supplied manufacturer, the destination, etc.,) in an easy-to-understand format and make a statistical evaluation to carry out the whole evaluation; this is a problem.

If the electronic machine manufacturer of audio machines, etc., has a research laboratory and a manufacturing plant at separate locations and has an oversea affiliated firm, if the results of measurement formerly conducted separately in the research laboratory, the manufacturing plant, the oversea affiliated firm, etc., can be managed in a unified manner and shared among them, for example, by connecting the research laboratory as a server and the manufacturing plant and the oversea affiliated firm through a communication network (for example, the Internet), contributions to development, design, manufacturing, sale, etc., can be expected.

DISCLOSURE OF THE INVENTION

It is therefore an object of the invention to provide an automatic measuring apparatus and an automatic measurement data processing and control apparatus of electronic machines for making it possible to execute various measurements different in measurement item, measurement condition, standard, etc., on each measured object by simple operation. It is another object of the invention to provide a network system for making it possible to share the measurement result of the automatic measurement value among the research laboratories, the manufacturing plants, the oversea sites, etc., of a manufacturer.

To the end, according to a first aspect of the invention, there is provided an automatic measuring apparatus for giving a test signal to a measured object implemented as an electronic machine and measuring the measured object, the automatic measuring apparatus comprising display control means for displaying test conditions corresponding to a specified measurement category in a predetermined format, test condition selection and setting instruction means for instructing a test condition fitted to the measured object to be selected and set from among a plurality of test conditions displayed by the display control means, selection and setting means for selecting and setting a test condition instructed to be selected and set by the test condition selection and setting instruction means, test data generation means for generating test data based on the test condition set by the selection and setting means, and measurement timing control means for controlling the test data generation means to generate test data and sending the generated test data to test signal generation means.

According to a second aspect of the invention, there is provided an automatic measuring apparatus for giving a test signal to a measured object implemented as an electronic machine and measuring the measured object, the automatic measuring apparatus comprising display means for displaying a plurality of selection and setting screens or listing screens represented in predetermined formats, retention and storage means for retaining and storing the formats of the plurality of selection and setting screens or listing screens, display control means for displaying the plurality of selection and setting screens or listing screens stored in the retention and storage means on the display means in a predetermined order, selection and setting means for selecting and setting a test condition for measuring the measured object from the selection and setting screen displayed on the display means by the display control means, test data generation means for generating test data based on the test condition selected and set through the selection and setting means, measurement timing control means for inputting the test data generated by the test data generation means to test signal generation means, test signal generation means for generating a test signal based on the test data input by the measurement timing control means and giving the generated test signal to the measured object, and signal measurement means for measuring a signal output from the measured object to which the test signal is input from the test signal generation means and outputting the measurement result.

In a third aspect of the invention, the automatic measuring apparatus in the first or second aspect of the invention further includes antenna input signal generation means for inputting the test signal generated by the test signal generation means and generating an antenna input signal of the measured object.

According to a fourth aspect of the invention, there is provided a network system comprising a management apparatus comprising a data base and communication control means, a communication network, and a plurality of automatic measuring apparatus as claimed in any one of claims 1 to 3 comprising communication control means for controlling communication with the management apparatus through the network, characterized in that the management apparatus receives measurement results and/or files transmitted through the communication network from the plurality of automatic measuring apparatus and recording them in the database, and that each of the plurality of automatic measuring apparatus can read or download any desired measurement result or file recorded in the data base at any desired timing.

In a fifth aspect of the invention, in the network system in the fourth aspect of the invention, the management apparatus creates or updates list information of the measurement results and files recorded in the database and records the list information in the database, and the automatic measuring apparatus reads the list information and selects the measurement result or file to be read or downloaded.

In a sixth aspect of the invention, the network system in the fourth or fifth aspect of the invention further includes a plurality of terminals each comprising communication control means for controlling communication with the management apparatus, wherein each of the plurality of terminals can read or download any desired measurement result or file recorded in the data base at any desired timing.

According to a seventh aspect of the invention, there is provided an automatic measurement data processing and control apparatus implemented as a computer configured so as to be able to transfer data to and from a measuring instrument for giving a test signal from test signal generation means to a measured object implemented as an electronic machine and measuring the measured object, the automatic measurement data processing and control apparatus comprising display means, first display control means for displaying test conditions corresponding to a measurement category specified for one measured object in a first format, test condition selection and setting instruction means for instructing a test condition fitted to the measured object to be selected and set from among a plurality of test conditions displayed on the display means by the first display control means, selection and setting means for selecting and setting a test condition instructed to be selected and set by the test condition selection and setting instruction means, and test data generation means for generating test data based on the test condition set by the selection and setting means.

In an eighth aspect of the invention, the automatic measurement data processing and control apparatus in the seventh aspect of the invention further includes a plurality of conditions files registering initial values for testing electronic machines by measurement category, and initial value extraction means for extracting the initial value for testing corresponding to the test condition set through the selection and setting means, wherein the test data generation means generates test data based on the initial value for testing extracted by the initial value extraction means.

In a ninth aspect of the invention, the automatic measurement data processing and control apparatus in the seventh or eighth aspect of the invention further includes measurement timing control means for controlling the test data generation means to generate test data and sending the generated test data to the test signal generation means.

In a tenth aspect of the invention, in the automatic measurement data processing and control apparatus in any of the seventh to tenth aspects of the invention, the plurality of test conditions displayed on the display means by the first display control means comprise test conditions defined by a plurality of test items of a plurality of measurement items and the test condition selection and setting instruction means includes first selection and setting means for selecting and setting the current measurement item to be measured from among the plurality of measurement items and second selection and setting means for selecting and setting the current test item to be measured from among the test items of the measurement item selected through the first selection and setting means.

In an eleventh aspect of the invention, the automatic measurement data processing and control apparatus in any of the seventh to tenth aspects of the invention further includes second display control means for displaying measurement category information classifying the measurement conditions of electronic machines on the display means in a second format, and measurement category specification means for specifying the measurement category of one measured object from among pieces of the measurement category information displayed by the second display control means.

In a twelfth aspect of the invention, the automatic measurement data processing and control apparatus in any of the seventh to tenth aspects of the invention further includes condition file retrieval means for retrieving a condition file registering the initial value for testing corresponding to the specified measurement category and retrieval instruction means for giving a retrieval instruction to the condition file retrieval means, wherein the first display control means includes third display control means for displaying the condition file retrieval result of the condition file retrieval means on the display means in a third format when the retrieval instruction means gives a retrieval instruction to the condition file retrieval means.

In a thirteenth aspect of the invention, the automatic measurement data processing and control apparatus in any of the seventh to tenth aspects of the invention further includes fourth display control means for displaying a measurement state on the display means in a fourth format.

In a fourteenth aspect of the invention, the automatic measurement data processing and control apparatus in any of the seventh to tenth aspects of the invention further includes setup value change instruction means for giving an instruction for changing setting of the initial value of the test condition displayed on the display means by the first display control means.

In a fifteenth aspect of the invention, the automatic measurement data processing and control apparatus in the fourteenth aspect of the invention further includes fifth display control means for displaying setting change means of the initial value of the test condition on the display means in a fifth format when an instruction is given through the setup value change instruction means.

In a sixteenth aspect of the invention, the automatic measurement data processing and control apparatus in the fourteenth aspect of the invention further includes sixth display control means for displaying setting change means of standard value on the display means in a sixth format when an instruction is given through the setup value change instruction means.

In a seventeenth aspect of the invention, the automatic measurement data processing and control apparatus in the fourteenth aspect of the invention further includes seventh display control means for displaying setting change means of the initial value of the measurement condition on the display means in a seventh format when an instruction is given through the setup value change instruction means.

In an eighteenth aspect of the invention, the automatic measurement data processing and control apparatus in the fourteenth aspect of the invention further includes eighth display control means for displaying setting change means of any setup value other than the initial value of the test condition, standard value, or the initial value of the measurement condition on the display means in an eighth format when an instruction is given through the setup value change instruction means.

In a nineteenth aspect of the invention, the automatic measurement data processing and control apparatus in any of the first to eighteenth aspects of the invention further includes retention and storage means for retaining and storing the condition file, change condition file creation means, when all or some of the setup values other than the initial values of the test conditions, standard values, or the initial values of the measurement conditions are changed, for creating a new condition file aside from the condition file based on the changed values and each initial value registered in the condition file, and storage control means for retaining and storing the new condition file created by the condition file creation means in the retention and storage means.

In a twentieth aspect of the invention, the automatic measurement data processing and control apparatus in any of the first to eighteenth aspects of the invention further includes retention and storage means for retaining and storing the condition file, master condition file creation means for creating a new condition file when setup values other than the initial values of the test conditions, standard values, or the initial values of the measurement conditions are entered, and storage control means for retaining and storing the new condition file created by the master condition file creation means in the retention and storage means as a master condition file.

According to a twenty-first aspect of the invention, there is provided an automatic measurement data processing and control apparatus implemented as a computer configured so as to be able to transfer data to and from a measuring instrument for giving a test signal from test signal generation means to a measured object implemented as an electronic machine and measuring the measured object, the automatic measurement data processing and control apparatus comprising display means for displaying a plurality of selection and setting screens or listing screens represented in predetermined formats, first retention and storage means for retaining and storing the formats, first display control means for displaying the plurality of selection and setting screens or listing screens on the display means in a predetermined order, selection and setting means for selecting and setting a condition for measuring the measured object from the selection and setting screen displayed on the display means by the first display control means, test data generation means for generating test data based on initial value for testing selected and set through the selection and setting means, and measurement timing control means for inputting the test data generated by the test data generation means to test signal generation means.

In a twenty-second aspect of the invention, the automatic measurement data processing and control apparatus in the twenty-first aspect of the invention further includes a plurality of condition files registering initial values for testing electronic machines by measurement category, second retention and storage means for retaining and storing the condition files, second display control means for displaying information concerning the condition file on the selection and setting screen or the listing screen displayed on the display means by the first display control means, and initial value extraction means for extracting the initial value for testing corresponding to the test condition set through the selection and setting means, wherein the test data generation means generates test data based on the initial value for testing extracted by the initial value extraction means.

In a twenty-third aspect of the invention, in the automatic measurement data processing and control apparatus in the twenty-second aspect of the invention, the plurality of selection and setting screen contain a testing initial value change screen for changing the initial value for testing registered in the condition file, the automatic measurement data processing and control apparatus further including change value input means for changing the initial value for testing when the display control means displays the testing initial value change screen on the display means, change condition file creation means for creating a new condition file when the initial value for testing is changed through the change value input means, and storage control means for retaining and storing the change condition file created by the change condition file creation means in the second retention and storage means.

BRIEF DESCRIPTION OF THE DRAWINGS

In the accompanying drawings:

FIG. 7 is a drawing to show one embodiment of a main menu screen;

FIG. 9 is a drawing to show one embodiment of a condition file listing screen;

FIG. 12 is a drawing to show one embodiment of a test condition registration screen;

FIG. 13 is a drawing to show one embodiment of a standard value registration screen;

FIG. 15 is a drawing to show one embodiment of a miscellaneous condition setting screen;

FIG. 16 is a drawing to show one embodiment of a change determination screen; and FIG. 17 is a drawing to show one embodiment of a measurement result display screen.

MODES FOR CARRYING OUT THE INVENTION

[Hardware Configuration Example of Automatic Measuring Apparatus]

Figure 1:
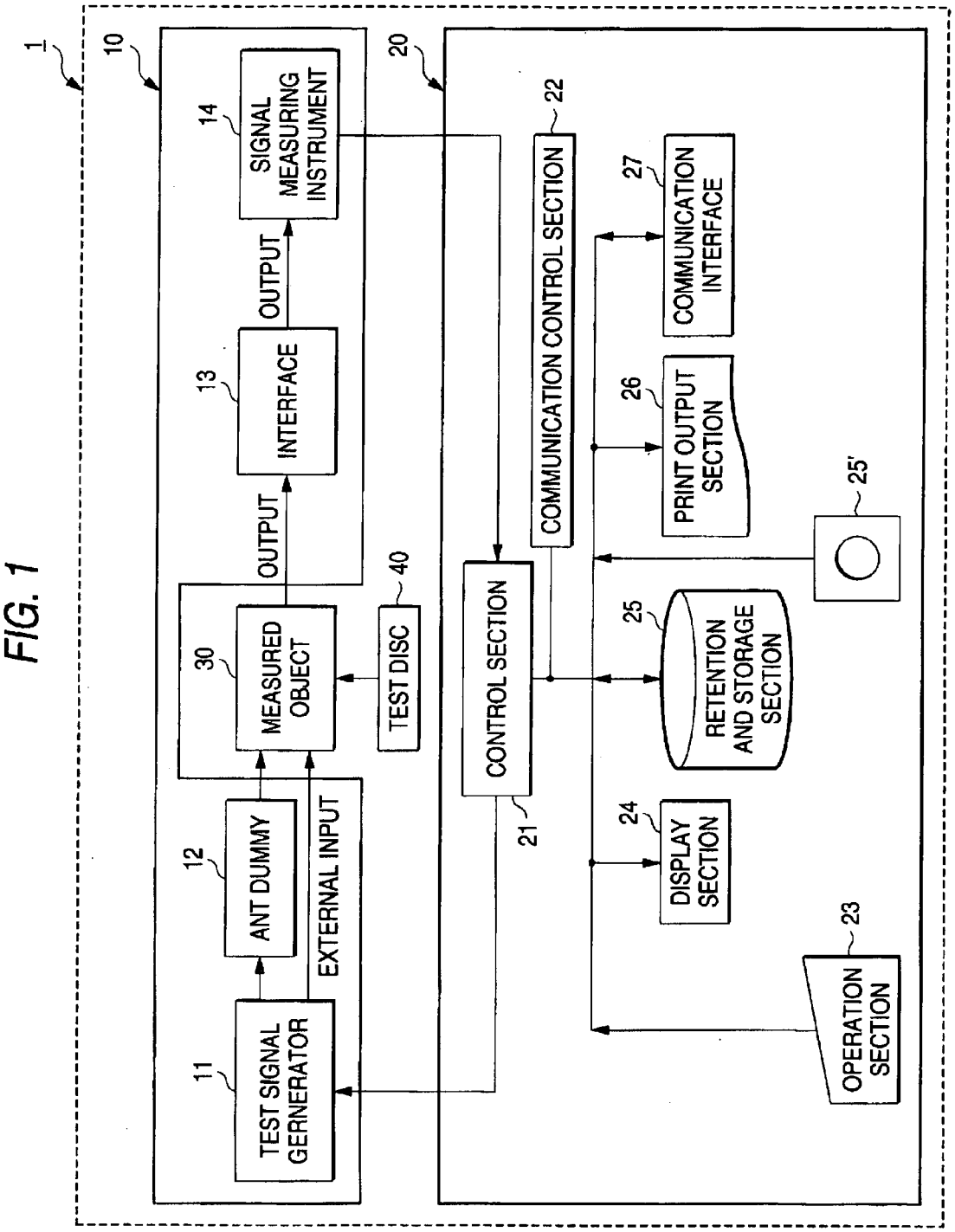
FIG. 1 is a block diagram to show the hardware configuration of one embodiment of an automatic measuring apparatus of the invention.

FIG. 1 is a block diagram to show the hardware configuration of one embodiment of an in-car audio automatic measuring apparatus. An in-car audio automatic measuring apparatus for measuring in-car audio machines as electronic machines will be discussed as an example.

Figure 6:
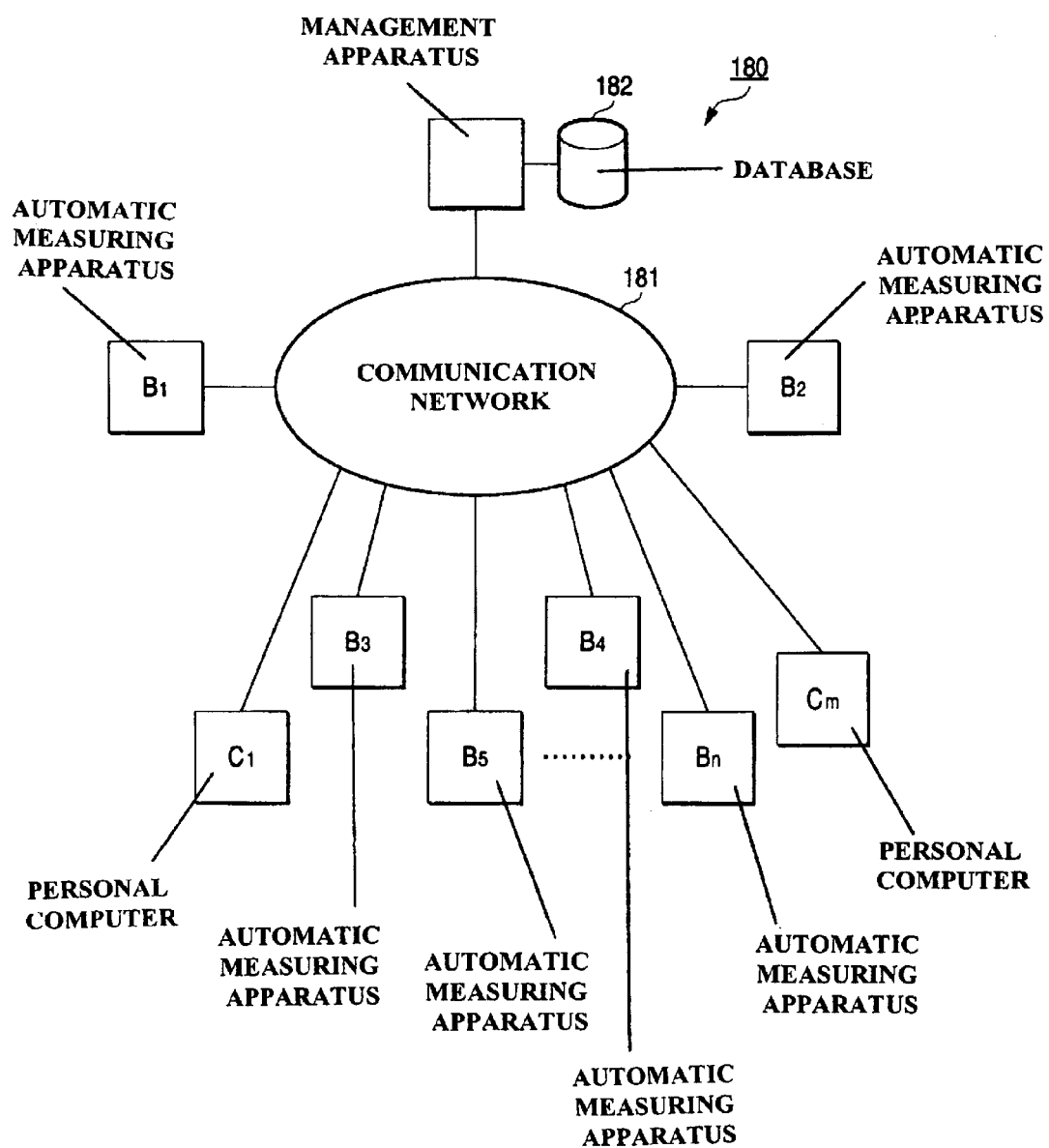
FIG. 6 is a schematic representation of one embodiment of a network system.

In FIG. 1, the in-car audio automatic measuring apparatus 1 comprises a signal automatic measuring section 10 and a data processing and control section 20. The data processing and control section 20 gives a control signal and test data to the signal automatic measuring section 10 and the signal automatic measuring section 10 inputs various test signals generated based on the control signal and the test data from the data processing and control section 20 to a measured object 30 and measures an output signal from the measured object 30 and outputs the measurement value to the data processing and control section 20. The data processing and control section 20 processes the measurement result and stores the processed result in a retention and storage section 25 (retention memory) in a predetermined data format. The data processing and control section 20 can share the measurement data with external in-car audio automatic measuring apparatus B1 to Bn via a communication network as shown in FIG. 6.

(Signal Automatic Measuring Section)

The signal automatic measuring section 10 comprises a test signal generator 11 for giving various test signals varying according to the measurement items, the measurement conditions, and the standard to the measured object (in the example, audio machine), an antenna dummy (ANT dummy) 12 for generating a signal given to an antenna of the measured object based on the test signal from the test signal generator 11, an interface 13 for converting various signals output from the measured object 30 to which the test signals are input into a signal format that can be measured by measuring instruments making up a signal measuring instrument 14, and the signal measuring instrument 14 for obtaining the measurement value from the signal from the interface 13 and displaying, etc., the measurement value and sending the measurement result to the data processing and control section 20. The signal automatic measuring section 10 may comprise other measuring instruments, such as a stabilized power supply and an oscilloscope, although these are not shown.

In the embodiment, the test signal generator 11 comprises signal generators of three standard signal generators (SSG), two stereo modulators, two audio signal generators, etc., and gives test signals to the measured object based on test parameters (numeric test data) from the data processing and control section 20. In this case, for radio system test data, the test signal from the test signal generator 11 is given to the antenna of the measured object 30 through the dummy ANT 12. To test the audio system, the test signal generator 11 inputs the test signal from an external input terminal of the measured object 30.

In the embodiment, the signal measuring instrument 14 comprises two audio analyzer and one noise meter and measures output of the interface 13 and converts the measurement result into digital data, then sends the digital data to the data processing and control section 20.

(Data Processing and Control Section)

The data processing and control section 20 is implemented as a computer, such as a personal computer, and comprises a control section 21, an operation section 23, a display section 24, the above-mentioned retention and storage section 25, and a print output section 26. Preferably, it comprises a communication control section 22 and a communication interface 27. The data processing and control section 20 may be provided with a second retention and storage section 25' to and from which a removable storage medium such as a compact disc or a floppy disk can be attached and detached.

The control section 21 is made up of a CPU, ROM, RAM, and peripheral circuitry although these are not shown, and controls the whole operation of the data processing and control section 20 under an OS (operating system). It also performs timing control of sending a control signal and test data to the signal automatic measuring section 10 and reading the automatic measurement result from the signal automatic measuring section 10 by an automatic measurement processing and control program of the invention.

The control section 21 controls execution of the measurement processing and control program of the invention based on an instruction of the person in charge through the operation section 23 and as described later, displays various screens such as a processing menu screen, a listing screen of supplied parties, destinations, measurement items, measurement conditions, standard, etc., by band, and a measurement result evaluation screen on the display section 24 in a predetermined format. The control section 21 also displays data (menu data, supplied party names, destination names, measurement item names, measurement conditions (values), standards (values), etc.,) on the screens and sends control signals and test data for generating test signals based on the selection operation and adjustment value entry operation of the person in charge such as menus selection and destination selection to the signal automatic measuring section 10 (the test signal generator 11).

The control section 21 also reads the measurement value sent from the signal automatic measuring section 10 (the signal measuring instrument 14), makes an evaluation, edits the measurement result, displays the result on an output screen such as measurement result evaluation screen displayed on the display section 24, and retains and stores the measurement result and the evaluation result in the retention and storage section 25 as required.

The operation section 23 comprises keys of a keyboard, etc., and a pointing device of a mouse, etc. The person in charge can click on (or point at) a button displayed on the screen by operating a mouse (or key) for entering selection, adjustment (change) data, etc. When the person in charge operates the key or mouse, an input signal is sent to the control section 21.

The display section 24 comprises a display screen of a liquid-crystal display, etc., and display memory of VRAM, etc., and displays a screen and icons in a predetermined format and converts transferred data into an image (text, graphics, picture), then displays the image in a display zone of the screen under the control of the control section 21.

The retention and storage section 25 is implemented as removable retention memory of a magnetic disk, an optical disk, etc., for retaining and storing OS (in the embodiment, Windows (trademark of Microsoft Corporation) is used, but the OS is not limited to Windows) and automatic measurement programs and auxiliary programs of the invention such as a screen display program, a parameter generation program, a measurement result evaluation program, an edit program, and a measurement result display program.

The retention and storage section 25 also retains and stores the measurement result and the evaluation values of the in-car audio automatic measuring apparatus 1, a plurality of conditions files, each name file, etc., under the control of the control section 21.

A removable storage medium such as a compact disc (CD) or a floppy disk (FD) can be attached to and detached from the retention and storage section 25'.

The retention and storage section 25' can copy the condition files and the measurement data or the evaluation data retained and stored in the retention and storage section 25 under the control of the control section 21. A record medium such as a CD or an FD onto which the condition files and the measurement data or the evaluation data retained and stored in the retention and storage section 25 are copied can be retained as a save medium or can be loaded into any other apparatus for use.

The measurement processing and control programs, the screen format, the standard condition file, constants, etc., of the invention are recorded on a CD or an FD and when the in-car audio automatic measuring apparatus 1 is installed, the CD or FD is loaded into the retention and storage section 25' and the contents of the CD or FD can also be installed (retained and stored in the retention and storage section 25) under the OS. When the measurement processing and control programs are revised completely or partially (upgraded), portions which need to be updated (module, screen format, constant, etc.,) are previously recorded on a CD or an FD and all or some of the measurement processing and control programs retained and stored in the retention and storage section 25 can be updated (if the screen format is described in each screen display program, in the embodiment, it is assumed to be a "program" forming a part of the measurement processing and control programs).

The measurement data and the evaluation data (or the condition files, the measurement data and the evaluation data) are retained and stored in the retention and storage section 25 and the programs may be read from the retention and storage section 25' (namely, the OS and the measurement processing and control programs and the screen format (standard condition file, constants, etc.,) of the invention recorded on the CD or the FD may be used to perform data processing and measurement control).

The retention and storage section 25' can copy the condition files and the measurement data or the evaluation data retained and stored in the retention and storage section 25 directly into the retention and storage section 25 from the RAM under the control of the control section 21.

The print output section 26 is implemented as a data print output unit such as a printer or a plotter and prints out the edited measurement data and evaluation result in a predetermined format.

The communication control section 22 can establish a protocol with the network and control transfer of measurement data and evaluation values provided by any other automatic measuring apparatus via the communication interface 27 and the network (and a management apparatus (described later)).

If the second retention and storage section 25' to and from which a removable storage medium such as a floppy disk (FD) can be attached and detached is provided, a record medium on which the measurement data and the evaluation values are stored can be held as a backup medium and can also be loaded into any other automatic measuring apparatus having the same configuration and function as the automatic measuring apparatus 1 for using the data between the automatic measuring apparatus.

(Measured Object)

The measured object 30 is an electronic machine such as an audio machine; in the embodiment, an in-car audio machine installing any of a radio (MW (AM), SW, LW, FM, WB (weather band, only in North America)), an audio control, a CD, or an MD is adopted as the measured object. At the test time, for the radio system, a test signal from the dummy ANT 12 is input from the antenna, for the audio system, a test signal is input from the test signal generator 11, and for the CD or MD, a dedicated test disc (test DISC 40) is inserted. The operation result (output signal) of the measured object 30 as the test signal is input is measured by the signal measuring instrument 14 through the interface 13.

(Test DISC)

The test DISC 40 stores a test signal (audio signal) of CD or MD and is inserted into the measured object 30 like CD or MD as a normal storage medium. The test signal from the test DISC 40 is an audio signal input from a pickup for the CD or MD.

[Basic Operation of Automatic Measuring Apparatus]

Figure 2:
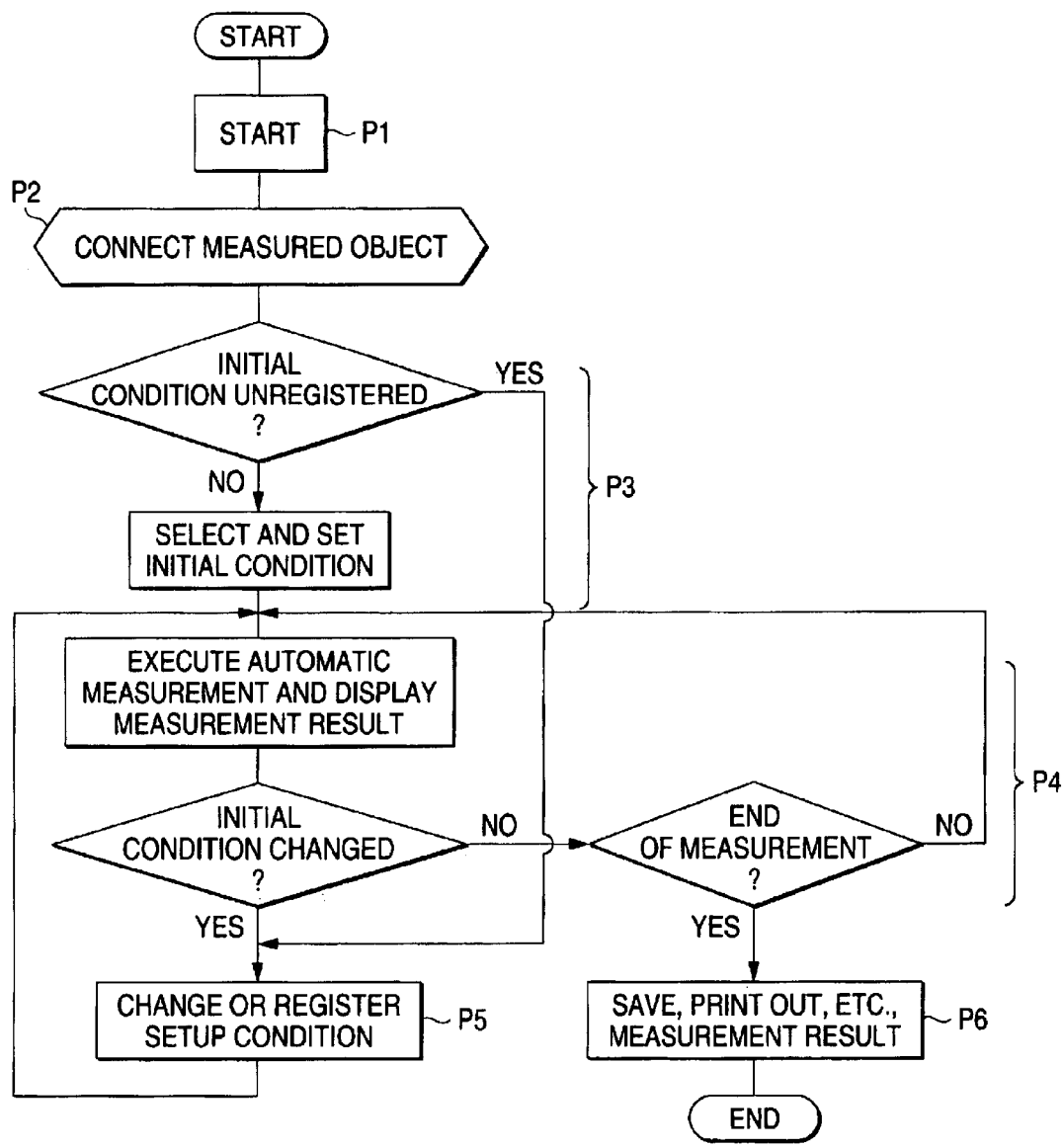
FIG. 2 is a process chart to show one embodiment of the basic operation of the automatic measuring apparatus.

FIG. 2 is a process chart to show one embodiment of the basic operation of the automatic measuring apparatus 1. The specific operation (embodiment) in processes P3 to P5 described below adopting an audio machine as the measured object 30 will be discussed with flowcharts of FIGS. 3 to 5. In the embodiment, the operation described below is performed by the measurement processing and control programs of the invention executed based on the management of the OS under the control of the control section 21.

Process P1: (Starting Automatic Measuring System)

In FIG. 2, when the automatic measuring apparatus 1 is started, the control section 21 starts the necessary programs including a selection setting program in an automatic measuring system (consisting of processing programs and auxiliary programs) following log-on of the OS (in the embodiment, Windows) and displays a main menu screen 70 as shown in FIG. 7, prompting the person in charge to select or set measurement category items (supplied party and destination and in the example in FIG. 7, band). At this time, the started programs are fetched from the retention and storage section 25 and are stored in the RAM of the control section 21. The names of the measurement category items of the supplied parties, the destinations, the bands, etc., are registered in the name file in the retention and storage section 25 and when the main menu screen 70 is displayed, they are fetched from the name file and are displayed. At the start time, the level person name in charge, the identification number, the password, and the like are entered to ensure security.

Process P2: (Connecting Measured Object)

The person in charge connects the measured object 30 to the signal automatic measuring section 10. To conduct different tests on the same measured object at the protocol design stage, the process maybe executed at the stage preceding the process P1. To use the automatic measuring apparatus 1 for product inspection on the manufacturing line, connection of the measured object 30 on the line and the signal automatic measuring section 10 can also be automated.

Process P3: (Setting Initial Conditions, etc.)

Figure 8:
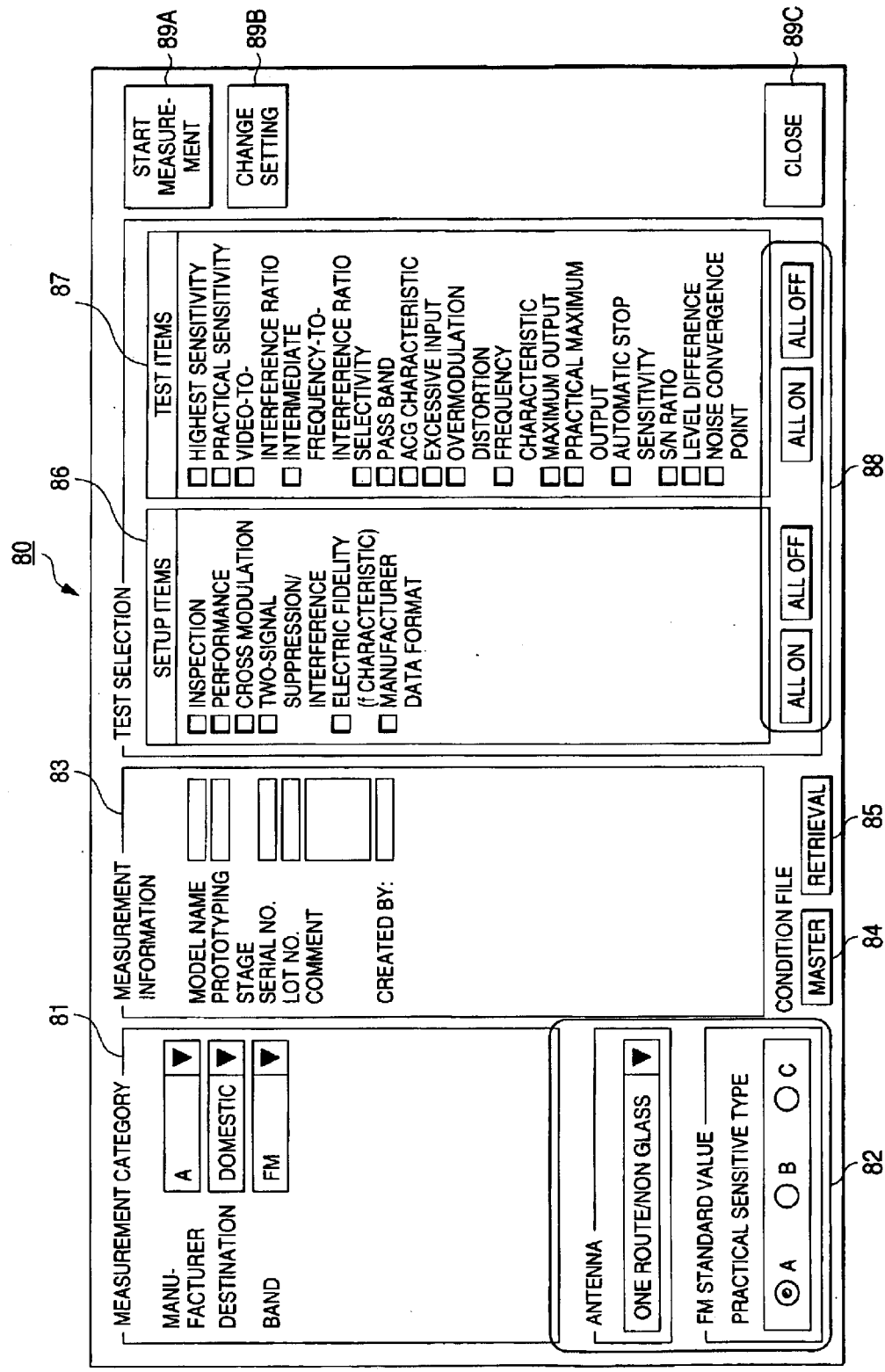
FIG. 8 is a drawing to show one embodiment of an initialization screen.

When the person in charge selects the supplied party, the destination, and a category item 73 determined for each supplied party and destination (in the example in FIG. 7, band) on the main menu screen in FIG. 7 and performs screen change operation (in the example in FIG. 7, points at a measurement button 74 (specification operation)), an initialization screen as shown in FIG. 8 is displayed.

When the person in charge enters measurement information of the model, etc., in a measurement information input field 83, the corresponding condition file is automatically selected. At the time, the condition files are retrieved and a condition file listing screen 90 as shown in FIG. 9 can also be displayed for selecting the necessary condition file.

If the initial conditions, etc., of the measured object 30 are not registered in the condition file, the person in charge performs change operation (in the example, points at a CHANGE SETTING button 89B), thereby making a transition to P5 for changing or registering the initial conditions.

Next, the person in charge selects test selection items (measurement items and test items) displayed on the initialization screen 80.

Since the measurement conditions, the measurement items, and the standard values vary depending on the combination of the measurement category items (supplied party, destination, band, etc.,), the conditions files are default files corresponding to the combinations (files in which the default values (initial values) of the supplied party standard specifications are registered) and include as many master condition files (standard value condition files) as the number of the valid combinations of the measurement category items and each change condition file containing change values provided by test; the condition files are retained and stored in the retention and storage section 25.

In the example in FIG. 7, numeral 71 denotes a supplied party display field for displaying the supplied parties with products, numeral 72 denotes a destination display field 72, and a numeral 73 denotes a band display field. If the measured object 30 is any other electronic machine than an electronic machine comprising a receiver such as an audio machine, the items for that electronic machine are displayed in the band display field 73 in a format different from that in the example.

Process P4: (Automatic Measurement)

Upon completion of the initialization in the process P3, a control signal (test start signal) is sent from the data processing and control section 20 to the signal automatic measuring section 10 and the setup values given according to the condition file (master condition file (process P3) or change condition file (process P5)) (if an adjustment value is entered, the value changed according to the adjustment value) about each test item for each measurement item are given from the data processing and control section 20 to the test signal generator 11 as test data.

The test signal generator 11 gives a test signal to the measured object 30 based on the test data from the data processing and control section 20 (numeric test data) as described above. In this case, to test the radio system, the test signal from the test signal generator 11 is given to the antenna of the measured object 30 through the dummy ANT 12. To test the audio system, the test signal generator 11 inputs the test signal through the external input terminal of the measured object 30. For the CD or MD, the person in charge inserts the test DISC 40 into the measured object 30.

An output signal from the measured object 30 to which the test signal, etc., is input is input through the interface 13 to the signal measuring instrument 14, which then makes measurement on each test item and sends the measurement result (digital data) to the data processing and control section 20. At this time, the input and output waveforms may be displayed on an analog waveform display of an oscilloscope, etc.

Figure 10:
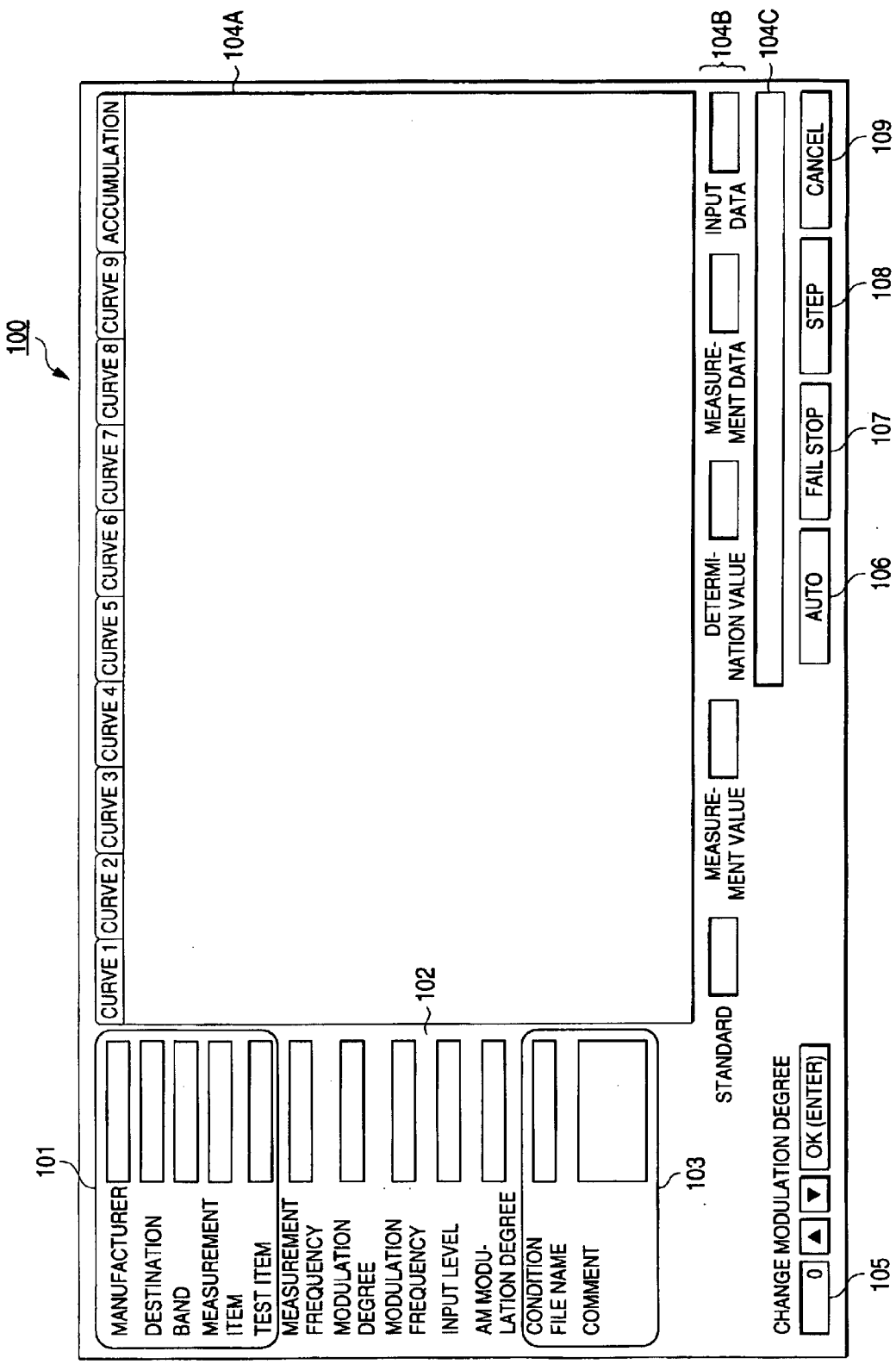
FIG. 10 is a drawing to show one embodiment of a measurement state display screen.
Figure 11:
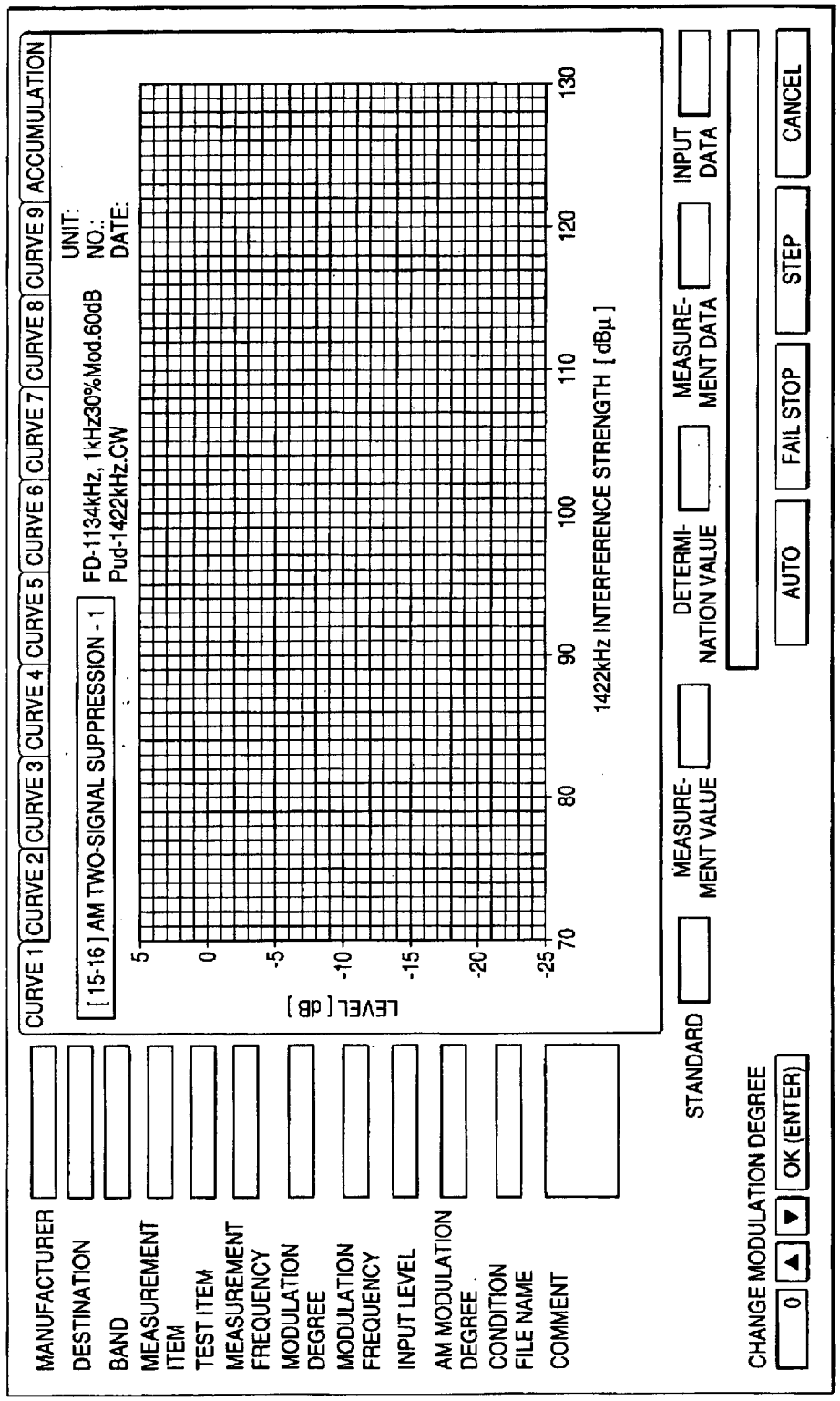
FIG. 11 is a drawing to show one embodiment of a measurement state display screen.

The control section 21 displays a test result display screen 100 (or 110) as shown in FIG. 10 (or FIG. 11) for displaying the measurement data from the signal automatic measuring section 10 (signal measuring instrument 14) (FIG. 11 shows a display example for displaying the measurement result as a graph).

If the person in charge is to change the setup condition on his or her own for conducting a test or needs to change the setup condition in seeing the display of the test result display screen 100 (or 110), the person in charge performs the screen change operation (in the example, clicks on a CANCEL button 109). Upon completion of the automatic measurement, a transition to P6 is made.

Process P5: (Changing, Registering Setup Conditions, etc.)

Figure 12:
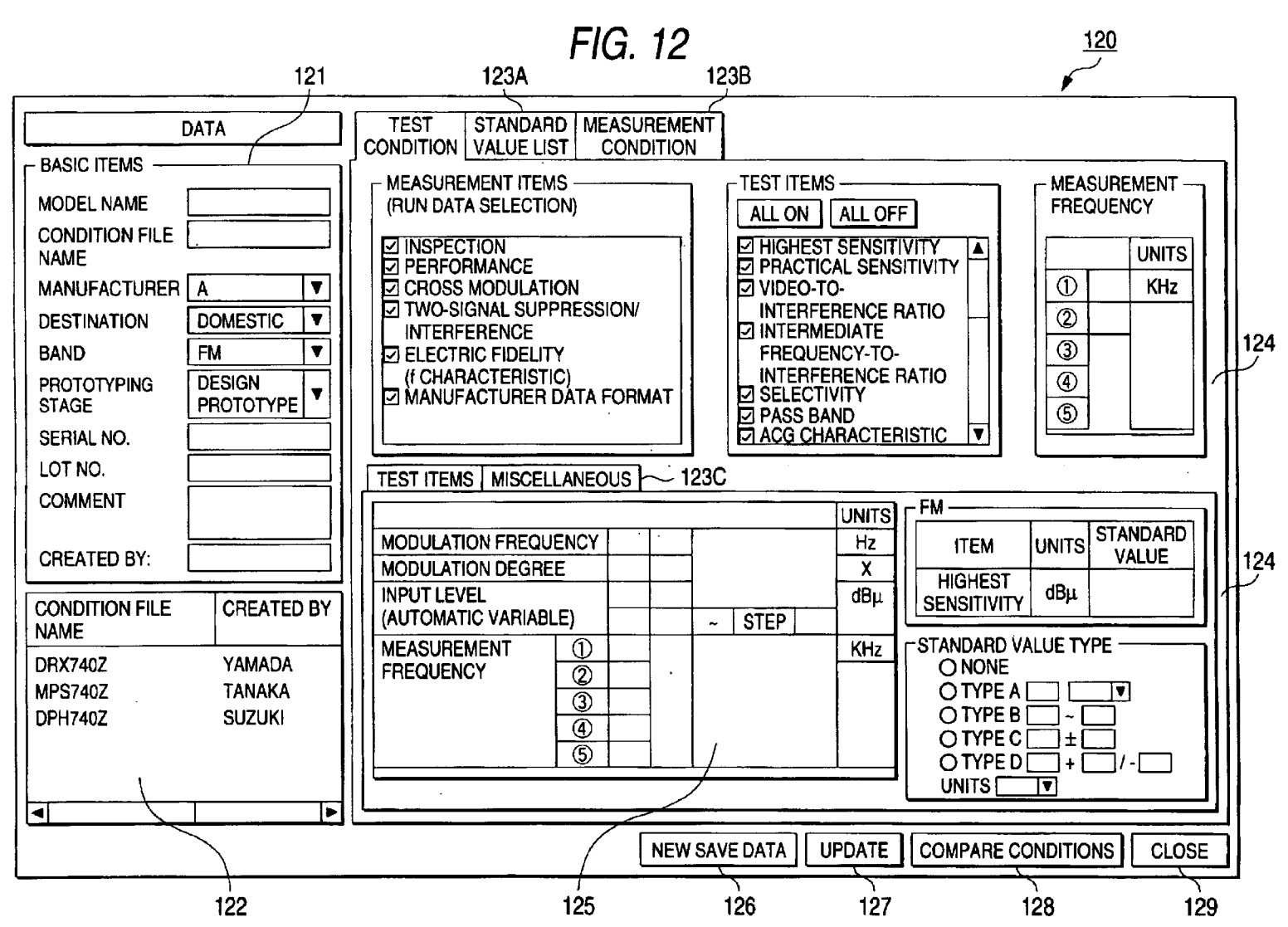

If the initial conditions, etc., are not registered in the condition file in the process P3 or setting change is required in the process P4 and the screen change operation is performed, the control section 21 displays a test condition registration screen 120 as shown in FIG. 12.

Figure 14:
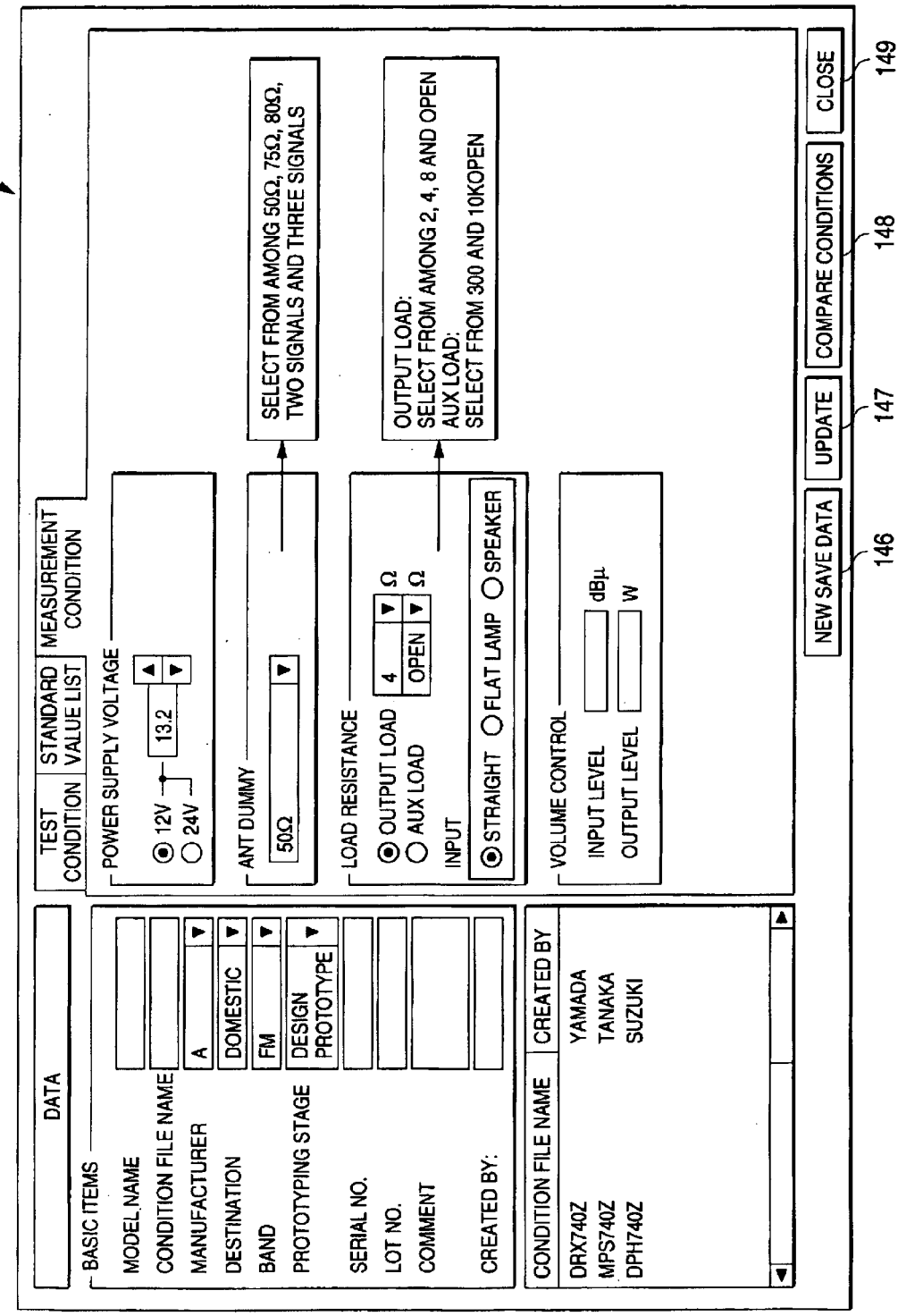
FIG. 14 is a drawing to show one embodiment of a measurement condition setting screen.

To newly register or change initial values of test conditions, the person in charge uses the test condition registration screen 120 to enter the test conditions; to newly register or change standard values, the person in charge uses a standard value registration screen 130 as shown in FIG. 13 to enter the standard values; to newly register or change initial values of measurement conditions, the person in charge uses a measurement condition registration screen 140 as shown in FIG. 14 to enter the measurement conditions; and to newly register or change miscellaneous setup values, the person in charge uses a miscellaneous setup value registration screen 150 as shown in FIG. 15 to enter the miscellaneous setup values. Registration of the file name required for creating the change condition file or the master condition file and the like can be executed on the condition file listing screen 90 shown in FIG. 9.

Upon completion of the change or registration operation of any setup value other than the initial values of the test conditions, the standard values, or the initial values of the measurement conditions, a new condition file aside from the above-mentioned condition files is created based on the changed values and the initial values registered in the above-mentioned condition files and is retained and stored in the retention and storage section 25 (25'). If any setup value other than the initial values of the test conditions, the standard values, or the initial values of the measurement conditions is newly entered, a master condition file is created and is stored in the retention and storage section 25 (25').

Upon completion of the change or registration operation of the setup values, control returns to the process P4 and automatic measurement is started based on the changed setup values. When the operation is executed on each test item set in each measurement item for each setup measurement item and the test (measurement) on all registered test items is complete, a transition to a process P6 is made.

Process P6: (Displaying, Saving, Printing Out, etc., Measurement Result)

If the setup value is changed in the process P5, a change condition file is created and is stored in the retention and storage section 25. At this time, a comparison with the already existing condition files (master condition file and change condition file created preceding the master condition file) is made and the current changed setup value can be displayed on a change check screen 160 as shown in FIG. 16 for checking.

The control section 21 retains and stores the measurement value (determined value) in the retention and storage section 25 for each test item of each measurement item set for each measured object 30. A measurement result listing screen 170 as shown in FIG. 17 can be displayed for retrieving, editing, and displaying the measurement result and the measurement result can be edited and printed out using an edit program.

According to the configuration, a plurality of pieces of test data involved in the measured object can be generated for each measurement category of the supplied party, the destination, etc., simply by performing the change operation of the displayed screens and selecting and setting the display contents, and the measured object can be measured by the test signal based on the test parameter. Thus, the setting time is reduced to a half or less as compared with the time of setting and entering the test data formerly executed by the manual operation of the person in charge at the measuring time. Moreover, entry mistakes such as parameter value read errors are decreased and it is made possible for even a non-skilled person to easily perform operation.

The operator can change the setup value on the screen while seeing the measurement result, and measurement can be repeated with the changed value. Thus, to test at the prototyping stage or at the quality inspection time, the setup value can be changed by simple operation to repeat test, and the efficiency of development test is improved.

[Specific Operation Example of Automatic Measuring Apparatus]

Figure 3:
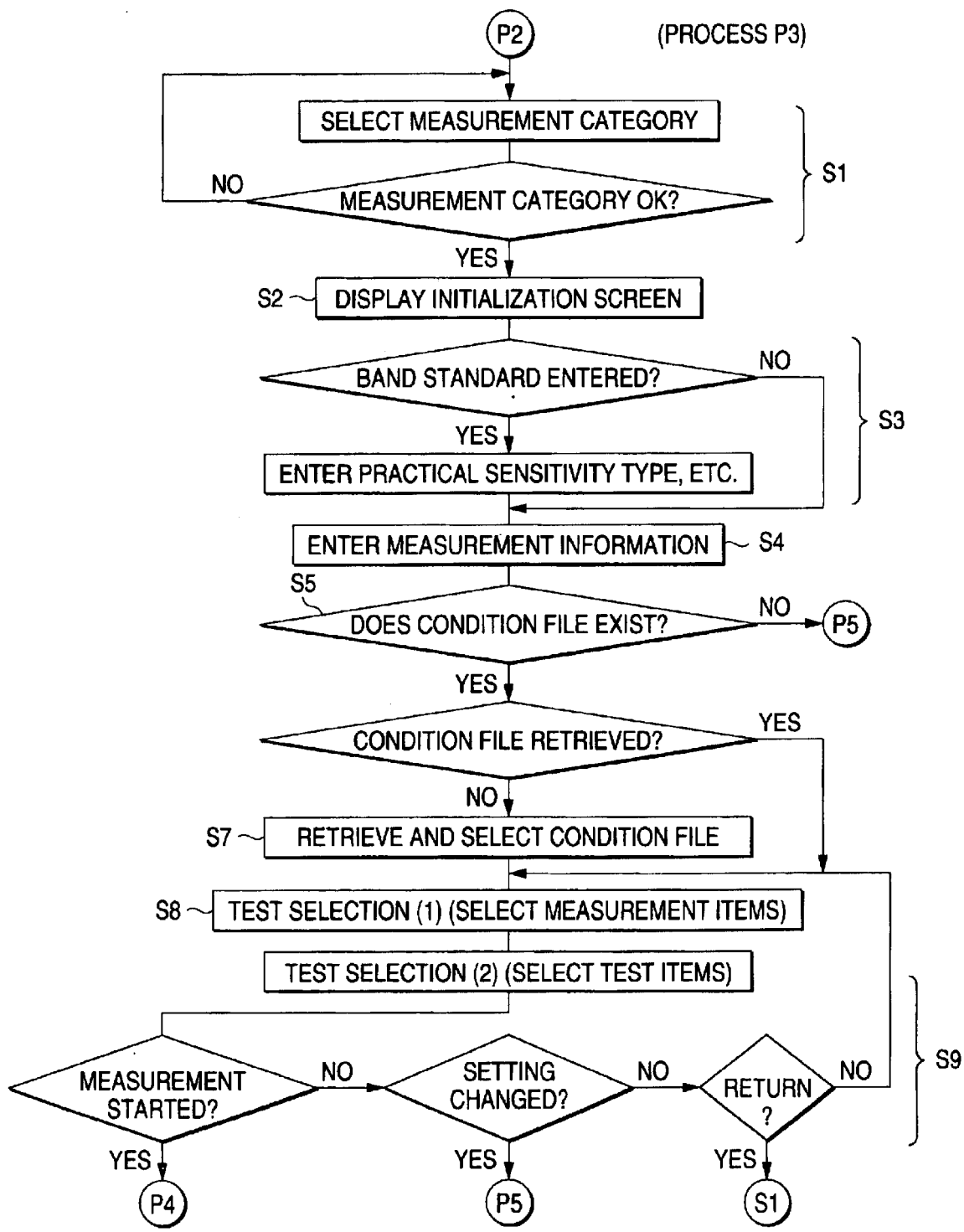
FIG. 3 is a flowchart to show an operation example when initial conditions are selected and set.
Figure 4:
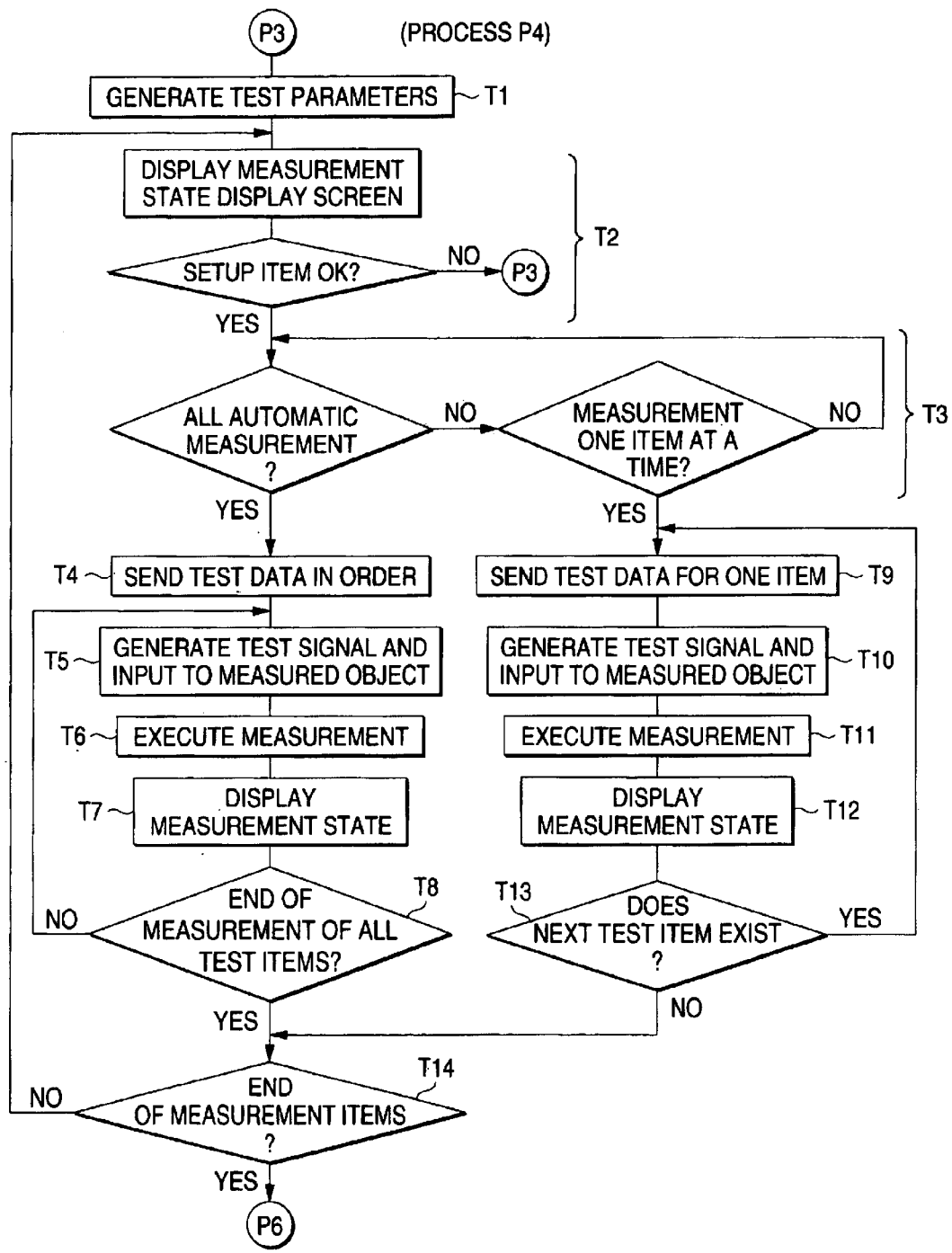
FIG. 4 is a flowchart to show an operation example at the automatic measuring time.
Figure 5:
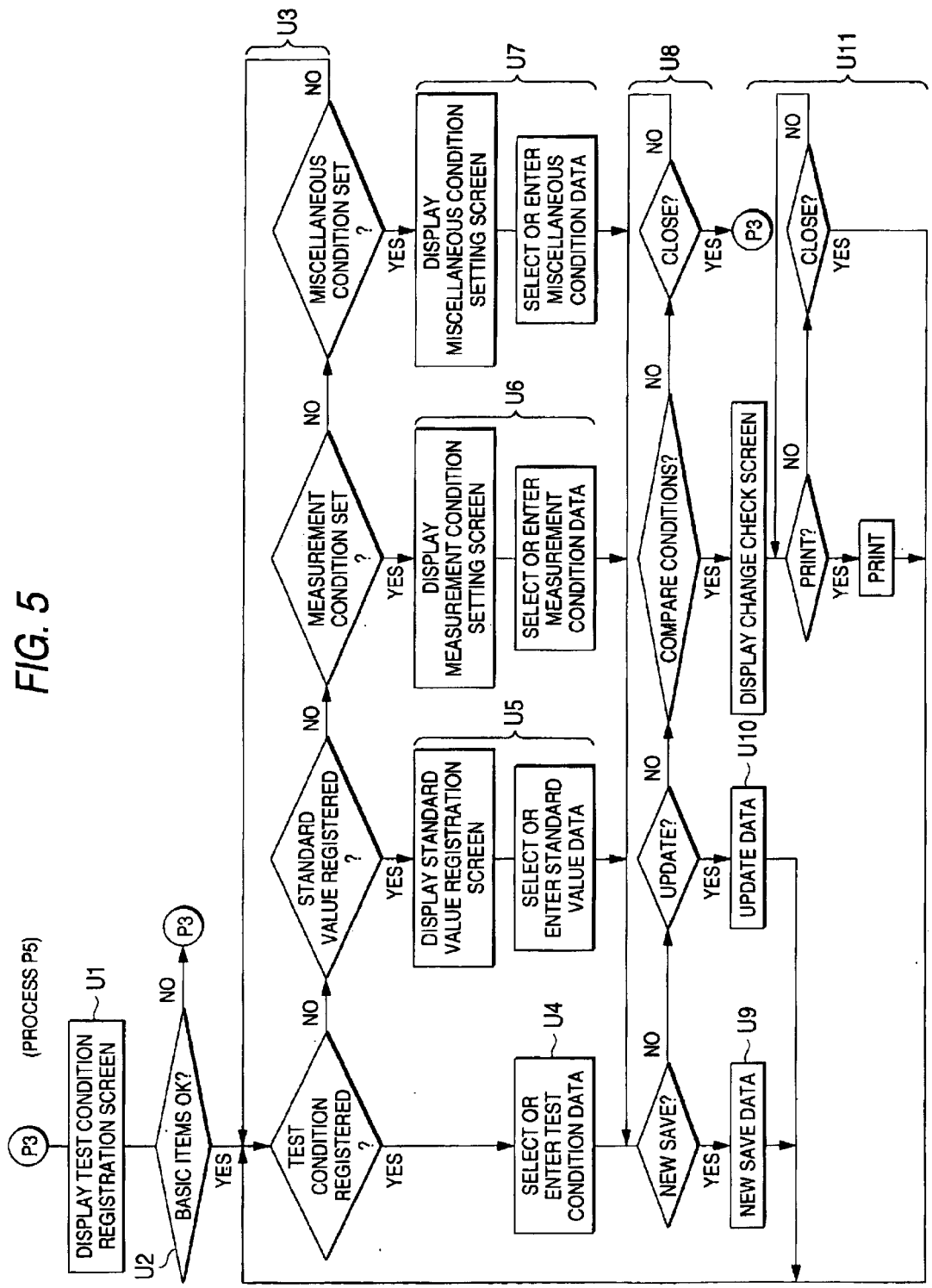
FIG. 5 is a flowchart to show an operation example when setup conditions are changed or registered.

FIGS. 3 to 5 are flowcharts to show the specific operation in the processes P3 to P5 (FIG. 2) with an in-car audio machine as the measured object 30. FIG. 3 is a flowchart to show an operation example of the control section 21 when the initial conditions are selected and set, FIG. 4 is a flowchart to show an operation example of the control section 21 and the signal automatic measuring section 10 at the automatic measuring time, and FIG. 5 is a flowchart to show an operation example of the control section 21 when setup conditions are changed or registered.

1. Operation Example When Initial Conditions are Selected and Set (P3)

Step S1: (Selecting Measurement Category)

In FIG. 3, the person in charge selects supplied party 71 and destination 72 and a band 73 displayed on the matrix of the supplied parties and the destinations on the main menu 70. (In the description to follow, the case where supplied party "A," destination "DOMESTIC," and band "FM" are selected is taken as an example.

The control section 21 checks a signal from the operation section 23 and if the operator clicks on (points at) the MEASUREMENT button on the main menu screen 70, the control section 21 determines that the measurement category has been selected, and makes a transition to S2.

Step S2: (Displaying Initialization Screen)

The control section 21 displays the initialization screen 80 as shown in FIG. 8. At this time, the measurement category name selected at the step S1 (supplied party "A," destination "DOMESTIC," band "FM") is displayed in a measurement category display field 81. An antenna system and a selection field of practical sensitivity type as band (in the example, FM) standard value and standard type (in the example, A) are displayed in a display field 82.

Step S3: (Selecting Band Standard Value, etc.)

To select the band standard value (in the example, FM standard value), either type A or B in the selection field of practical sensitivity type is selected by operating the mouse, etc.; not to select the band standard value, a transition to step S4 is made.

Step S4: (Entering Measurement Information)

The control section 21 prompts the operator to enter measurement information of model name, prototyping stage, serial number, lot number, comment, person in charge of measurement, etc., in a measurement information input field 83. When they are entered, the control section 21 displays the measurement information pieces in the a measurement information input field 83 and retains them in the RAM.

Step S5: (Determining Whether or Not Condition File Exists)

The control section 21 searches for the retention and storage section 25 based on the selected measurement category and displays a master condition file of the corresponding condition files in a display field 84 as a condition file candidate. If the condition file may be the master file, a transition is made to S6 according to OK entry of the person in charge (for example, click operation with the right button of the mouse). If the condition file (master condition file) does not exist, a transition is made to P5 to newly register a condition file (create master condition file).

Step S6: (Retrieving, Selecting, etc., Condition File)

The control section 21 checks a signal from the operation section 23 and if the operator clicks on a retrieval button 85, the control section 21 makes a transition to S7 and displays the condition file listing screen 90 as shown in FIG. 9, searches for the condition files stored in the retention and storage section 25, and displays the search result on the condition file listing screen 90.

When the displayed condition file is not adequate, if the person in charge clicks on a RETRIEVE button 94 while changing the retrieval conditions of the supplied party, destination, band, etc., displayed in measurement category fields 91 to 93 on the condition file listing screen 90, search is repeated and condition files matching the retrieval conditions are listed.

If the person in charge clicks on the condition file name displayed on the condition file listing screen 90 and then clicks on a SELECT button 95, the condition file is selected and the control section 21 makes a transition to S8. If the person in charge clicks on a DELETE button 96, the condition file is deleted from the retention and storage section 25. If the person in charge clicks on a CLOSE button 97, the screen returns to the initialization screen 80.

In the example in FIG. 8, the condition file listing screen 90 is superposed on a part of the initialization screen 80, but the invention is not limited to such a display method (for example, the condition file listing screen 90 in FIG. 9 may be displayed aside from the initialization screen 80 in FIG. 8).

Step S8: (Test Selection (1); Selecting Measurement Items)

When the person in charge clicks on the SELECT button 95 at the step S7, the control section 21 displays the measurement items corresponding to the measurement category displayed in the measurement category display field 81 on the initialization screen 80 (or the measurement category selected on the condition file listing screen 90) and a cursor in a measurement item selection field 86 and prompts the person in charge to select test. In the example (in which the measurement category is supplied party (manufacturer) "A," destination "DOMESTIC," band "FM"), INSPECTION, PERFORMANCE, CROSS MODULATION, TWO-SIGNAL SUPPRESSION/ INTERFERENCE, ELECTRIC FIDELITY, and MAKER DATA FORMAT are displayed as the measurement items. If the person in charge moves the cursor on the necessary measurement items in order and clicks on (points at) OK, the control section 21 makes a transition to S9. If the person in charge clicks on an ALL ON button shown in a field 88 below the measurement item selection field 86, all items are assumed to be selected; if the person in charge clicks on an ALL OFF button, no items are assumed to be selected (this also applies below).

Step S9: (Test Selection (2); Selecting Test Items)

The control section 21 displays a plurality of test items corresponding to each measurement item selected at the step S8 in a test item display field 87 and prompts the person in charge to select the test items. In the example, HIGHEST SENSITIVITY, PRACTICAL SENSITIVITY, VIDEO-TO-INTERFERENCE RATIO, . . . , S/N RATIO, LEVEL DIFFERENCE, NOISE CONVERGENCE POINT, and the like are displayed as the test items. The person in charge can move the cursor on the necessary ones of the test items displayed for each measurement item selected at the step S8 and can select the test items. If the person in charge clicks on a START MEASUREMENT button 89A after clicking on OK, the control section 21 makes a transition to P4 (automatic measurement process); if the person in charge clicks on the CHANGE SETTING button 89B regardless of clicking on OK, the control section 21 makes a transition to P5 (setup condition change or registration process); and if the person in charge clicks on a CLOSE button 89C, the control section 21 returns to S1.

2. Operation Example At Automatic Measuring Time (P4)

Step T1: (Generating Test Parameters)

In FIG. 4, the control section 21 takes out the test item contents selected at step S9 of the process P3 (test data (values) stored at the addresses corresponding to the test items) from the condition file selected for each measurement category for each measurement item selected at step S8 of the process P3 and generates test parameters corresponding to the test items in the RAM (each test parameter contains the address (test signal generation module address) of the module for generating the test signal corresponding to the test item (for example, SSG, stereo modulator, audio signal generator) among the modules making up the test signal generator 1 and test condition (value) and code determining whether or not ANT input is enabled).

Step T2: (Displaying Measurement State Display Screen and Checking Setup Items, etc.)

The control section 21 displays the measurement state display screen 100 as shown in FIG. 10 and displays the measurement category name selected and set in the process P3 (supplied party, destination, band) in a display field 101 and the current measurement state (in the example, measurement frequency, modulation degree, input level, AM modulation degree) in a display field 102. The control section 21 also displays the condition file name and comment entered in the process P3 in a display field 103. To measure automatic stop sensitivity, etc., change input of electrolytic strength of SSG can be executed from a change modulation degree input field 105 by operating the mouse.

If the person in charge checks the display fields and finds setting omission, a selection mistake, etc., he or she clicks on a CANCEL button 109. Then, the control section 21 returns to the process P3, displays the initialization screen 80, and controls execution of the operation at step S1 and the later steps of P3.

Step T3: (Selecting Measurement Method)

Here, the person in charge can select automatic execution of measurement of all test items or one item at a time in the current measurement item. That is, if the person in charge clicks on an AUTO button 106 on the measurement state display screen 100 displayed on the display section 24, a transition is made to T4 and all automatic measurement is executed; if the person in charge clicks on a FAIL STOP button 107, a transition is made to T9 and measurement is executed one item at a time. The measurement method may be specified between steps T4 and T5 or steps T5 and T6 rather than between steps T2 and T4 (namely, at T3).

Step T4: (Sending Test Data, etc.)

The control section 21 sends test conditions (values) with a control signal (test start signal) and one measurement item in one group in order (at predetermined time intervals) to the test signal generator 11. At this time, the control section 21 sends the test data (condition value) with the test signal generation module address of the test parameter as the destination.

Step T5: (Generating Test Signal and Inputting to Measured Object)

The test signal generator 11 generates test signals for all test items of the current measurement item in order based on the test data from the data processing and control section 20 and inputs the test signals to the measured object. In this case, for the radio system test item, the test signal from the test signal generator 11 is input through the dummy ATN 12 to the antenna of the measured object 30. For the audio system test item, the test signal generator 11 inputs the test signal through the external input terminal of the measured object 30.

Step T6: (Measurement)

The signal measuring instrument 14 inputs an output signal from the measured object 30 via the interface 13 and executes measurement in order. The control section 21 classifies output (measurement value) of the signal measuring instrument 14 and determination value, standard value, measurement (test) data, input data, etc., by model, serial number, lot number, measurement category, and test item and temporarily stores the data in the RAM (or the retention and storage section 25).

Step T7: (Displaying Measurement State)

The control section 21 displays the current measurement item name and the current test item name under measuring at display positions of the display field 101 on the measurement state display screen 100 and also displays the values indicating the measurement state of the test item under measuring (standard value, measurement value, determination value, measurement (test) data, and input data) in order in a display field 104B. To display the measurement state as a graph, the values are displayed in a graph display field 104A. An operation instruction message can be displayed in a display field 104C.

Step T8: (Determining Whether Test Items Terminate)

The control section 21 checks whether measurement of all test items in the current measurement item terminates. If measurement of all test items terminates, the control section 21 makes a transition to T14; otherwise, T6 and T7 are repeated until measurement of all test items terminates.

Step T9: (Sending Test Parameter, etc.)

The control section 21 sends test conditions (values) with a control signal (test start signal) and one measurement item in one group to the test signal generator 11. At this time, the control section 21 sends the test condition (value) with the test signal generation module address of the test parameter as the destination.

Step T10: (Generating Test Signal and Inputting to Measured Object)

The test signal generator 11 generates a test signal for one test item of the current measurement item based on the test condition (value) from the data processing and control section 20 and inputs the test signal to the measured object. In this case, for the radio system test item, the test signal from the test signal generator 11 is input through the dummy ATN 12 to the antenna of the measured object 30. For the audio system test item, the test signal generator 11 inputs the test signal through the external input terminal of the measured object 30.

Step T11: (Measurement)

The signal measuring instrument 14 inputs an output signal from the measured object 30 via the interface 13 and executes measurement. The control section 21 classifies output (measurement value) of the signal measuring instrument 14 and determination value, standard value, measurement (test) data, input data, etc., by model (serial number), measurement category, and test item and temporarily stores the data in the RAM (or the retention and storage section 25).

Step T12: (Displaying Test Result (Under Measuring) (2))

The control section 21 displays the current measurement item name and the current test item name under measuring at display positions of the display field 101 on the measurement state display screen 100 and also displays the values indicating the measurement state of the test item under measuring (standard value, measurement value, determination value, measurement (test) data, and input data) in order in the display field 104B. To display the measurement state as a graph, the values are displayed in the graph display field 104A. An operation instruction message can be displayed in the display field 104C.

Step T13: (Determining Whether Test Items Terminate)

The control section 21 checks whether measurement of all test items in the current measurement item terminates. If measurement of all test items terminates, the control section 21 makes a transition to T14; otherwise, control returns to T3.

Step T14: (Determining Whether or Not Measurement Terminates)

The control section 21 checks whether measurement of all selected measurement items terminates. If measurement of all measurement items terminates, the control section 21 makes a transition to process P6; otherwise, the control section 21 returns to T2 to test the next measurement item.

3. Operation Example When Setup Conditions are Changed or Registered (P5)

Step U1: (Displaying Test Condition Registration Screen)

If new registration is required at step S5 of the process P3 in FIG. 3 or the operator clicks on the CHANGE SETTING button 89B at step S9, the control section 21 displays the test condition registration screen 120 as shown in FIG. 12 and prompts the person in charge to first check the basic items set in the process P3.

Step U2: (Checking Basic Items)

The person in charge checks the basic items displayed in a basic item display field 121 (model name, condition file name, manufacturer (supplied party), destination, band, prototyping stage, serial number, lot number, comment, and creator). The control section 21 checks the signal from the operation section 23 and if it detects the person in charge clicking on a CLOSE button 129, the control section 21 displays the initialization screen 80 for retry and makes a transition to process P3.

Step U3: (Selecting Registration (Setup) Contents)

If the person in charge wants to register or set data other than the test conditions, he or she clicks on any of a STANDARD VALUE LIST button 123A, a MEASUREMENT CONDITION button 123B, or a MISCELLANEOUS button 123C on the test condition registration screen 120. The control section 21 checks the signal from the operation section 23 and if the person in charge clicks on the STANDARD VALUE LIST button 123A, the control section 21 makes a transition to U5; if the person in charge clicks on the MEASUREMENT CONDITION button 123B, the control section 21 makes a transition to U6; and if the person in charge clicks on the MISCELLANEOUS button 123C, the control section 21 makes a transition to U7. If none of the buttons are pressed, the control section 21 makes a transition to U4.

Step U4: (Select or Enter Test Condition Data)

The control section 21 enables the person in charge to select or enter initial value data of measurement conditions related to the measurement items and the test items displayed in condition data input areas 124 and 125.

That is, for the measurement items, the measurement items displayed in a measurement item display field can be selected and measurement frequencies f1 to f6 can be entered (condition data input area 124). For the test items, the test items displayed in a test item display field can be selected and the initial values of the test conditions (in the example, test conditions differing depending on the measurement frequency, modulation degree, and test item) can be entered (condition data input area 125). The input format of the condition data input area 125 varies depending on the combination of the measurement and test items (display in a different format) Upon termination of selection or entry of the necessary standard data, if the person in charge clicks on any of a NEW SAVE DATA button 126, an UPDATE button 127, a COMPARE CONDITIONS button 128, or a CLOSE button 129, the control section 21 makes a transition to U8.

Step U5: (Displaying Standard Value Registration Screen and Selecting or Entering Standard Value Data)

The control section 21 displays the standard value registration screen 130 as shown in FIG. 13. The person in charge can set four types of standard ranges for each of the standard items listed on the standard value registration screen 130 (for example, reception frequency range, intermediate frequency, . . . , noise convergence point, capture ratio, and the like). Upon termination of selection or entry of the necessary standard data, if the person in charge clicks on any of a NEW SAVE DATA button 136, an UPDATE button 137, a COMPARE CONDITIONS button 138, or a CLOSE button 139, the control section 21 makes a transition to U8.

Step U6: (Displaying Measurement Condition Setting Screen and Select or Enter Measurement Condition Data)

The control section 21 displays the measurement condition registration screen 140 as shown in FIG. 14. The person in charge can select or enter the hardware measurement conditions of the radio system displayed on the measurement condition registration screen 140 (power supply voltage, ANT dummy, load resistance, and volume control level). (In the example shown in the figure, ANT dummy can be selected from among 50Ω, 75Ω, 80Ω, two signals, and three signals, output load of load resistance can be selected from among 2, 4, 8, and OPEN, and AUX load can be selected from 300 and 10 KOPEN.) Upon termination of selection or entry of the necessary initial value data of measurement conditions, if the person in charge clicks on any of a NEW SAVE DATA button 146, an UPDATE button 147, a COMPARE CONDITIONS button 148, or a CLOSE button 149, the control section 21 makes a transition to U8.

Step U7: (Displaying Miscellaneous Condition Setting Screen and Selecting or Enter Data)

The control section 21 displays the miscellaneous setup value registration screen 150 as shown in FIG. 15.

The person in charge can select or enter the conditions displayed on the miscellaneous setup value registration screen 150, for example, measurement operation conditions (determination method, allowable range, adjust, sleep time, etc.,) and can select audio analyzer filter (LPF, HPF, PSOPHO, etc.,). Upon termination of selection or entry of the necessary standard data, if the person in charge clicks on any of a NEW SAVE DATA button 156, an UPDATE button 157, a COMPARE CONDITIONS button 158, or a CLOSE button 159, the control section 21 makes a transition to U8.

Step U8: (Selecting Data and Selecting Processing After Input)

The control section 21 checks the signal from the operation section 23 and if the person in charge clicks on any of the NEW SAVE DATA button 126, 136, 146, or 156, the control section 21 makes a transition to U9; if the person in charge clicks on any of the UPDATE button 127, 137, 147, or 157, the control section 21 makes a transition to U10; if the person in charge clicks on any of the COMPARE CONDITIONS button 128, 138, 148, or 158, the control section 21 makes a transition to U11; and if the person in charge clicks on any of the CLOSE button 129, 139, 149, or 159, the control section 21 displays the initialization screen 80 and makes a transition to process P3.

Step U9: (New Save Processing)

The control section 21 displays the condition file listing screen 90 as shown in FIG. 9 and prompts the person in charge to enter the new condition file names for a new registration condition file and a new condition file created according to change.

When the person in charge enters OK, for the new registration file, one master condition file (condition file assigned the new entered name as the file name) is created from the measurement category, the measurement data, and the initial value data of the test conditions, the setup value data, the initial value data of the measurement conditions, and miscellaneous setup value data newly set at the steps U4 to U7 and is retained and stored in the retention and storage section 25 (25'), then a transition to U3 is made.

To change some or all of the initial values stored in the already registered condition file and create a new change condition file, the already setup condition file is copied and the copy is overwritten with a new entered name and change data to create one data file (condition file assigned the new entered name as the file name), then the data file is retained and stored in the retention and storage section 25 (25') and a transition to U3 is made.

Step U10: (Data Update Processing)

Since only the system administrator can update the registered data, the control section 21 determines the security level from the name of the person in charge and the identification code entered at the start time and if the person in charge is not the system administrator, the control section 21 displays a message of "You cannot update data" and makes a transition to U3.

If the person in charge is the system administrator, the control section 21 displays the condition file listing screen 90 as shown in FIG. 9. If the person in charge selects an already registered update condition file and enters OK, the corresponding items in the selected update condition file are overwritten with the update data of the measurement category, the measurement data, and the test condition data, the setup value data, the measurement condition data, and miscellaneous condition data newly set at the steps U4 to U7 and the resultant update file is retained and stored in the retention and storage section 25 (25') and a transition to U3 is made. The master condition files of the conditions files cannot be updated.

Step U11: (Change Item Check Processing)

The control section 21 displays the change check screen 160 as shown in FIG. 16 for comparing a condition file newly registered (or newly registered according to change) (comparison source 161) with already existing file (comparison destination 162 (for example, master condition file)). In this case, the contents displayed on the test condition registration screen are displayed in comparison.

If the person in charge clicks on a PRINT button 164, the condition file names and the contents of the comparison source 161 and the comparison destination 162 are printed out and if the person in charge clicks on a CLOSE button 165, a transition is made to U3.

FIG. 17 shows one embodiment of a measurement result listing screen 170. This measurement result listing screen 170 comprises a retrieval condition display field 171 for displaying the retrieval conditions, a RETRIEVE button 172 for retrieving the measurement result by measurement category and measurement item by performing selection operation, a retrieval result display field 173, a PREVIEW button 174 for producing preview display of the measurement result selected from among the retrieval results displayed in the retrieval result display field 173 as the operator clicks on the button 174 with the mouse, an EDIT button 175 for editing and displaying the selected measurement result, a DELETE button 176 for deleting the selected data, and a CLOSE button 177 for returning to the main menu screen 70 as the operator clicks on the button 177.

[Network System]

FIG. 6 is a drawing to show a configuration example of a network system comprising the automatic measuring apparatus of the invention (FIG. 1) and computers of personal computers, etc., as terminals. The network system is made up of a management apparatus A, automatic measuring apparatus B1, B2, . . . B5, . . . Bn as terminals, and terminals of personal computers, etc., C1, . . . Cm each comprising a communication control function connected to a communication network 181 such as the Internet (the computers of personal computers, etc., C1, . . . Cm may not be connected).

The management apparatus A is implemented as a computer comprising a database 182 and stores measurement data, condition data files, evaluation values, etc., transmitted from the automatic measuring apparatus B1 to Bn placed under the control of the management apparatus A in the database 182. When any of the automatic measuring apparatus B1 to Bn or the terminals of personal computers, etc., C1, . . . Cm access the database 182 as data reference, data transmission request, etc., the management apparatus A performs control and communication control of permission or no permission of the data reference, permission or no permission of the data transfer, etc., of the data stored in the database 182.

The management apparatus A can also issue a data transmission request to the automatic measuring apparatus B1 to Bn on its own schedule and upon reception of a data reference request or a data transmission request from any of the automatic measuring apparatus B1 to Bn or the computers of personal computers, etc., C1, . . . Cm, can also send a data transmission request to the automatic measuring apparatus B1 to Bn (except the requesting apparatus).

The management apparatus A may also used as any one of the automatic measuring apparatus B1 to Bn.

Each of the automatic measuring apparatus B1 to Bn has a similar configuration and function (measurement control operation and measurement operation) to those of the automatic measuring apparatus 1 of the invention shown in FIG. 1 and measures (tests) a measured object (electronic machine) and retains and stores the measurement result, the evaluation result, etc., in the retention and storage section (retention memory) 25. The automatic measuring apparatus B1 to Bn transmit the retained and stored data to the management apparatus A via the communication interface 27 and the communication network 181 and receives data transmitted from the management apparatus A under the control of the communication control section 22. The automatic measuring apparatus B1 to Bn issue a data transmission request and a data reception request to the management apparatus A and receives a data transmission request from the management apparatus A.

For the designer to reference or download the measurement data, the terminals of personal computers, etc., C1, . . . Cm can send a data reference request and a data transmission request to the management apparatus A, and the referenced data range and whether or not transmission of a data transmission request is enabled can be determined depending on the security level of the computer user.

The management apparatus A can create or update the measurement result and file list information recorded in the database 182 and record the created or updated information in the database 182. The automatic measuring apparatus B1 to Bn or the terminals C1, . . . Cm can read the list information recorded in the database 182 and select the measurement result or file to be read or downloaded.

According to the described configuration, for example, the result of measurement (test) of a protocol conducted by a prototyping department can be sent through the communication network 181 to the management apparatus A for storage in the database 182 and can be used in a development and design department to make improvement in comparison with the evaluation of a quality evaluation department and unify the standard, test conditions, etc., for a manufacturing department. Support, evaluation, etc., for oversea development departments can also be accomplished by sharing the measurement data using the network system of the invention.

In the above-described embodiment, the automatic measuring instrument 1 has been described as an integral-type apparatus consisting of the signal automatic measuring section 10 and the data processing and control section 20, but may adopt a configuration in which the measuring apparatus (signal automatic measuring section 10) for giving a test signal to a measured object implemented as an electronic machine from test signal generation means and measuring the measured object is connected to a computer (for example, a personal computer) that can be connected via an interface to the measuring apparatus (signal automatic measuring section 10). In this case, the automatic measurement processing and control program of the invention is installed in the computer, whereby a similar function to that of the data processing and control section 20 can be provided (namely, the same operation as that shown in the process flowchart of FIG. 2 and the flowcharts of FIGS. 3 to 5 can be performed).

Although the invention has been described in its preferred embodiments, it is to be understood that the invention is not limited to the specific embodiments and many apparently widely different embodiments of the invention may be made, needless to say.

Industrial Applicability

As described above, according to the automatic measuring apparatus in the first to third aspects of the invention and the automatic measurement data processing and control apparatus in the seventh to twenty-second aspects of the invention, a plurality of pieces of test data concerning the measured object can be generated for each measurement category of the supplied party, destination, etc., and the measured object can be measured by a test signal based on the test parameter simply by changing the displayed screen and selecting and setting the display contents. Thus, the setting time is reduced to a half or less as compared with the time of setting and entering the test data formerly executed by the manual operation of the person in charge at the measuring time. Moreover, entry mistakes such as parameter value read errors are decreased and it is made possible for even a non-skilled person to easily perform operation.

According to the network system in the fourth to sixth aspects of the invention, the measurement data and the evaluation result provided by the automatic measuring apparatus and the condition files, etc., can be managed in a unified manner and can be shared in real time among a plurality of automatic measuring apparatus.

According to the automatic measurement data processing and control apparatus in the fourteenth to eighteenth and twenty-second and twenty-third aspects of the invention, the operator can change the setup value on the screen while seeing the measurement result, and measurement can be repeated with the changed value. Thus, to test at the prototyping stage or at the quality inspection time, the setup value can be changed by simple operation to repeat test, and the efficiency of development test is improved.

According to the automatic measurement data processing and control apparatus in the nineteenth, twentieth, twenty-second, and twenty-third aspects of the invention, a condition file comprising changed values as initial values for testing can be newly registered, so that measurement can be repeated using the initial values for testing in the condition file registered at the prototyping stage, etc., and labor setting initial value each time can be saved. A condition file registering the initial values for testing fitted to a measured object can also be recorded on a separate record medium for use with another automatic measuring apparatus.

What is claimed is:

1. An automatic measuring apparatus for giving a test signal to a measured object implemented as an electronic machine and measuring the measured object, said automatic measuring apparatus comprising:

display control means for displaying a plurality of test conditions corresponding to a specified measurement category in a predetermined format;

test condition selection and setting instruction means for instructing that one of said plurality of a test conditions fitted to the measured object be selected and set from among said plurality of test conditions;

selection and setting means for selecting and setting said instructed test condition;

test data generation means for generating test data based on the test condition set by said selection and setting means; and measurement timing control means for controlling said test data generation means to generate test data and for sending the generated test data to test signal generation means.

2. An automatic measuring apparatus for giving a test signal to a measured object implemented as an electronic machine and measuring the measured object, said automatic measuring apparatus comprising:

displaying means for displaying a plurality of selection and setting screens or listing screens represented in predetermined formats;

retention and storage means for retaining and storing the predetermined formats of the plurality of selection and setting screens or listing screens;

display control means for displaying the plurality of selection and setting screens or listing screens stored in said retention and storage means on said display means in a predetermined order on the basis of a designated measurement category;

selection and setting means for selecting and setting a test condition for measuring the measured object from the selection and setting screen displayed on said display means by said display control means;

test data generation means for generating test data based on the test condition selected and set through said selection and setting means;

measurement timing control means for inputting the test data generated by said test data generation means to test signal generation means;

test signal generation means for generating a test signal based on the test data input by said measurement timing control means and giving the generated test signal to the measured object; and signal measurement means for measuring a signal output from the measured object to which the test signal is input from said test signal generation means and outputting the measurement result.

3. The automatic measuring apparatus as claimed in claim 2, further comprising:

antenna input signal generation means for inputting the test signal generated by said test signal generation means and generating an antenna input signal of the measured object.

4. The network system comprising a management apparatus comprising a data base and communication control means, a communication network, and a plurality of automatic measuring apparatus as claimed in claim 1, comprising communication control means for controlling communication with said management apparatus through said network, wherein said management apparatus receives measurement results and/or files transmitted through said communication network from said plurality of automatic measuring apparatus and recording them in the database, and each of said plurality of automatic measuring apparatus can read or download any desired measurement result or file recorded in the data base at any desired timing.

5. The network system as claimed in claim 4, wherein said management apparatus creates or updates list information of the measurement results and files recorded in the database and records the list information in the database, and said automatic measuring apparatus reads the list information and selects the measurement result or file to be read or downloaded.

6. The network system as claimed in claim 4, further comprising:

a plurality of terminals each comprising communication control means for controlling communication with said management apparatus, wherein each of the plurality of terminals can read or download any desired measurement result or file recorded in the data base at any desired timing.

7. An automatic measurement data processing and control apparatus implemented as a computer configured so as to be able to transfer data to and from a measuring instrument for giving a test signal from test signal generation means to a measured object implemented as an electronic machine and measuring the measured object, said automatic measurement data processing and control apparatus comprising:

display means;

first display control means for displaying test conditions corresponding to a measurement category specified for one measured object in a first format;

test condition selection and setting instruction means for instructing a test condition fitted to the measured object to be selected and set from among a plurality of test conditions displayed on said display means by said first display control means;

selection and setting means for selecting and setting a test condition instructed to be selected and set by said test condition selection and setting instruction means; and test data generation means for generating test data based on the test condition set by said selection and setting means.

8. The automatic measurement data processing and control apparatus as claimed in claim 7, further comprising:

a plurality of conditions files registering initial values for testing electronic machines by measurement category; and initial value extraction means for extracting the initial value for testing corresponding to the test condition set through said selection and setting means, wherein said test data generation means generates test data based on the initial value for testing extracted by said initial value extraction means.

9. The automatic measurement data processing and control apparatus as claimed in claim 7, further comprising:

measurement timing control means for controlling said test data generation means to generate test data and sending the generated test data to said test signal generation means.

10. The automatic measurement data processing and control apparatus as claimed in claim 7, wherein the plurality of test conditions displayed on said display means by said first display control means comprise test conditions defined by a plurality of test items of a plurality of measurement items, and said test condition selection and setting instruction means includes first selection and setting means for selecting and setting the current measurement item to be measured from among the plurality of measurement items and second selection and setting means for selecting and setting the current test item to be measured from among the test items of the measurement item selected through the first selection and setting means.

11. The automatic measurement data processing and control apparatus as claimed in claim 7, further comprising:

second display control means for displaying measurement category information classifying the measurement conditions of electronic machines on said display means in a second format; and measurement category specification means for specifying the measurement category of one measured object from among pieces of the measurement category information displayed by said second display control means.

12. The automatic measurement data processing and control apparatus as claimed in claim 7, further comprising:

condition file retrieval means for retrieving a condition file registering the initial value for testing corresponding to the specified measurement category, and retrieval instruction means for giving a retrieval instruction to said condition file retrieval means, wherein said first display control means includes third display control means for displaying the condition file retrieval result of the condition file retrieval means on said display means in a third format, when the retrieval instruction means gives a retrieval instruction to said condition file retrieval means.

13. The automatic measurement data processing and control apparatus as claimed in claim 7, further comprising:

fourth display control means for displaying a measurement state on said display means in a fourth format.

14. The automatic measurement data processing and control apparatus as claimed in claim 7, further comprising:

setup value change instruction means for giving an instruction for changing setting of the initial value of the test condition displayed on said display means by said first display control means.

15. The automatic measurement data processing and control apparatus as claimed in claim 14, further comprising:

fifth display control means for displaying setting change means of the initial value of the test condition on said display means in a fifth format, when an instruction is given through said setup value change instruction means.

16. The automatic measurement data processing and control apparatus as claimed in claim 14, further comprising:

sixth display control means for displaying setting change means of standard value on said display means in a sixth format, when an instruction is given through said setup value change instruction means.

17. The automatic measurement data processing and control apparatus as claimed in claim 14, further comprising:

seventh display control means for displaying setting change means of the initial value of the measurement condition on said display means in a seventh format, when an instruction is given through said setup value change instruction means.

18. The automatic measurement data processing and control apparatus as claimed in claim 14, further comprising:

eighth display control means for displaying setting change means of any setup value other than the initial value of the test condition, standard value, or the initial value of the measurement condition on said display means in an eighth format, when an instruction is given through said setup value change instruction means.

19. The automatic measurement data processing and control apparatus as claimed in claim 7, further comprising:

retention and storage means for retaining and storing the condition file, change condition file creation means, when all or some of the setup values other than the initial values of the test conditions, standard values, or the initial values of the measurement conditions are changed, for creating a new condition file aside from the condition file based on the changed values and each initial value registered in the condition file, and storage control means for retaining and storing the new condition file created by said condition file creation means in said retention and storage means.

20. The automatic measurement data processing and control apparatus as claimed in claim 7, further comprising:

retention and storage means for retaining and storing the condition file, master condition file creation means for creating a new condition file when setup values other than the initial values of the test conditions, standard values, or the initial values of the measurement conditions are entered, and storage control means for retaining and storing the new condition file created by the master condition file creation means in the retention and storage means as a master condition file.

21. An automatic measurement data processing and control apparatus implemented as a computer configured so as to be able to transfer data to and from a measuring instrument for giving a test signal from test signal generation means to a measured object implemented as an electronic machine and measuring the measured object, said automatic measurement data processing and control apparatus comprising:

display means for displaying a plurality of selection and setting screens or listing screens represented in predetermined formats;

first retention and storage means for retaining and storing the predetermined formats;

first display control means for displaying the plurality of selection and setting screens or listing screens on said display means in a predetermined order on the basis of a designated measurement category;

selection and setting means for selecting and setting a condition for measuring the measured object from the selection and setting screen displayed on said display means by said first display control means;

test data generation means for generating test data based on an initial value for testing selected and set through said selection and setting means; and measurement timing control means for inputting the test data generated by said test data generation means to test signal generation means.

22. The automatic measurement data processing and control apparatus as claimed in claim 21, further comprising:

a plurality of condition files registering initial values for testing electronic machines by measurement category;

second retention and storage means for retaining and storing the condition files;

second display control means for displaying information concerning the condition file on the selection and setting screen or the listing screen displayed on said display means by said first display control means; and initial value extraction means for extracting the initial value for testing corresponding to the test condition set through said selection and setting means, wherein said test data generation means generates test data based on the initial value for testing extracted by said initial value extraction means.

23. The automatic measurement data processing and control apparatus as claimed in claim 22, wherein the plurality of selection and setting screens contain a testing initial value change screen for changing the initial value for testing registered in the condition file, said automatic measurement data processing and control apparatus, further comprising:

change value input means for changing the initial value for testing when said display control means displays the testing initial value change screen on said display means;

change condition file creation means for creating a new condition file when the initial value for testing is changed through said change value input means; and storage control means for retaining and storing the change condition file created by said change condition file creation means in said second retention and storage means.

24. A recording medium recording an automatic measurement processing and control program for generating test data for generating a test signal and controlling the output timing of the generated test data, in an automatic measuring apparatus for giving the test signal from test signal generation means to a measured object implemented as an electronic machine and measuring the measured object, wherein said automatic measurement processing and control program is configured so as to:

display test conditions corresponding to a measurement category specified for one measured object in a predetermined format, when an instruction is given for selecting and setting a test condition fitted to the measured object from among a plurality of displayed test conditions, select and set a test condition instructed to be selected and set, extract the initial value for testing corresponding to the test condition from the condition file registering the initial values of the test conditions based on the setup test condition to generate test data, and control the timing of sending the generated test data to the test signal generation means.

25. A recording medium recording an automatic measurement processing and control program for generating test data for generating a test signal and controlling the output timing of the generated test data, in an automatic measuring apparatus for giving a test signal from test signal generation means to a measured object implemented as an electronic machine and measuring the measured object, wherein said automatic measurement processing and control program is configured so as to:

display a plurality of selection and setting screens or list screens on display means in a predetermined order;

as specified, display the selection and setting screen and test conditions of the measured object;

select and set the condition for measuring the measured object out of the selection and setting screen;

extract the initial value for testing corresponding to the selected and setup condition from a plurality of condition files registering the initial values for testing electronic machines by measurement category to generate test data; and control the timing of sending the generated test data to the test signal generation means.

26. The network system comprising a management apparatus comprising a data base and communication control means, a communication network, and a plurality of automatic measuring apparatus as claimed in claim 2, comprising communication control means for controlling communication with said management apparatus through said network, wherein said management apparatus receives measurement results and/or files transmitted through said communication network from said plurality of automatic measuring apparatus and recording them in the database, and each of said plurality of automatic measuring apparatus can read or download any desired measurement result or file recorded in the data base at any desired timing.

27. The network system comprising a management apparatus comprising a data base and communication control means, a communication network, and a plurality of automatic measuring apparatus as claimed in claim 3, comprising communication control means for controlling communication with said management apparatus through said network, wherein said management apparatus receives measurement results and/or files transmitted through said communication network from said plurality of automatic measuring apparatus and recording them in the database, and each of said plurality of automatic measuring apparatus can read or download any desired measurement result or file recorded in the data base at any desired timing.

28. The network system as claimed in claim 5, further comprising:

a plurality of terminals each comprising communication control means for controlling communication with said management apparatus, wherein each of the plurality of terminals can read or download any desired measurement result or file recorded in the data base at any desired timing.

29. The automatic measurement data processing and control apparatus as claimed in claim 8, further comprising:

measurement timing control means for controlling said test data generation means to generate test data and sending the generated test data to said test signal generation means.

30. The automatic measurement data processing and control apparatus as claimed in claim 8, wherein the plurality of test conditions displayed on said display means by said first display control means comprise test conditions defined by a plurality of test items of a plurality of measurement items, and said test condition selection and setting instruction means includes first selection and setting means for selecting and setting the current measurement item to be measured from among the plurality of measurement items and second selection and setting means for selecting and setting the current test item to be measured from among the test items of the measurement item selected through the first selection and setting means.

31. The automatic measurement data processing and control apparatus as claimed in claim 9, wherein the plurality of test conditions displayed on said display means by said first display control means comprise test conditions defined by a plurality of test items of a plurality of measurement items, and said test condition selection and setting instruction means includes first selection and setting means for selecting and setting the current measurement item to be measured from among the plurality of measurement items and second selection and setting means for selecting and setting the current test item to be measured from among the test items of the measurement item selected through the first selection and setting means.

32. The automatic measurement data processing and control apparatus as claimed in claim 8, further comprising:

second display control means for displaying measurement category information classifying the measurement conditions of electronic machines on said display means in a second format; and measurement category specification means for specifying the measurement category of one measured object from among pieces of the measurement category information displayed by said second display control means.

33. The automatic measurement data processing and control apparatus as claimed in claim 9, further comprising:

second display control means for displaying measurement category information classifying the measurement conditions of electronic machines on said display means in a second format; and measurement category specification means for specifying the measurement category of one measured object from among pieces of the measurement category information displayed by said second display control means.

34. The automatic measurement data processing and control apparatus as claimed in claim 8, further comprising:

condition file retrieval means for retrieving a condition file registering the initial value for testing corresponding to the specified measurement category, and retrieval instruction means for giving a retrieval instruction to said condition file retrieval means, wherein said first display control means includes third display control means for displaying the condition file retrieval result of the condition file retrieval means on said display means in a third format, when the retrieval instruction means gives a retrieval instruction to said condition file retrieval means.

35. The automatic measurement data processing and control apparatus as claimed in claim 9, further comprising:

condition file retrieval means for retrieving a condition file registering the initial value for testing corresponding to the specified measurement category, and retrieval instruction means for giving a retrieval instruction to said condition file retrieval means, wherein said first display control means includes third display control means for displaying the condition file retrieval result of the condition file retrieval means on said display means in a third format, when the retrieval instruction means gives a retrieval instruction to said condition file retrieval means.

36. The automatic measurement data processing and control apparatus as claimed in claim 8, further comprising:

fourth display control means for displaying a measurement state on said display means in a fourth format.

37. The automatic measurement data processing and control apparatus as claimed in claim 9, further comprising:

fourth display control means for displaying a measurement state on said display means in a fourth format.

38. The automatic measurement data processing and control apparatus as claimed in claim 8, further comprising:

setup value change instruction means for giving an instruction for changing setting of the initial value of the test condition displayed on said display means by said first display control means.

39. The automatic measurement data processing and control apparatus as claimed in claim 9, further comprising:

setup value change instruction means for giving an instruction for changing setting of the initial value of the test condition displayed on said display means by said first display control means.

40. The automatic measurement data processing and control apparatus as claimed in claim 8, further comprising:

retention and storage means for retaining and storing the condition file, change condition file creation means, when all or some of the setup values other than the initial values of the test conditions, standard values, or the initial values of the measurement conditions are changed, for creating a new condition file aside from the condition file based on the changed values and each initial value registered in the condition file, and storage control means for retaining and storing the new condition file created by said condition file creation means in said retention and storage means.

41. The automatic measurement data processing and control apparatus as claimed in claim 9, further comprising:

retention and storage means for retaining and storing the condition file, change condition file creation means, when all or some of the setup values other than the initial values of the test conditions, standard values, or the initial values of the measurement conditions are changed, for creating a new condition file aside from the condition file based on the changed values and each initial value registered in the condition file, and storage control means for retaining and storing the new condition file created by said condition file creation means in said retention and storage means.

42. The automatic measurement data processing and control apparatus as claimed in claim 8, further comprising:

retention and storage means for retaining and storing the condition file, master condition file creation means for creating a new condition file when setup values other than the initial values of the test conditions, standard values, or the initial values of the measurement conditions are entered, and storage control means for retaining and storing the new condition file created by the master condition file creation means in the retention and storage means as a master condition file.

43. The automatic measurement data processing and control apparatus as claimed in claim 9, further comprising:

retention and storage means for retaining and storing the condition file, master condition file creation means for creating a new condition file when setup values other than the initial values of the test conditions, standard values, or the initial values of the measurement conditions are entered, and storage control means for retaining and storing the new condition file created by the master condition file creation means in the retention and storage means as a master condition file.

44. An automatic measuring apparatus that measures an electronic machine, the apparatus comprising:

a display that displays a plurality of test conditions that each correspond to an electronic machine and a specified measurement category in a predetermined format;

a test condition selector that selects one of the plurality of test conditions;

a test data generator that generates test data based on the selected test condition; and a measurement timing controller that controls the test data generator to send the generated test data to a test signal generator.

* * * * *